(12) United States Patent
Uchida et al.

(10) Patent No.: US 9,784,294 B2
(45) Date of Patent: Oct. 10, 2017

(54) ATTACHMENT STRUCTURE FOR CLIP

(71) Applicant: PENTEL KABUSHIKI KAISHA, Chuo-ku, Tokyo (JP)

(72) Inventors: Hideo Uchida, Soka (JP); Masashi Machida, Soka (JP)

(73) Assignee: PENTEL KABUSHIKI KAISHA (JP)

( * ) Notice: Subject to any disclaimer, the term of this patent is extended or adjusted under 35 U.S.C. 154(b) by 71 days.

(21) Appl. No.: 14/770,255

(22) PCT Filed: Dec. 27, 2014

(86) PCT No.: PCT/JP2014/054881
§ 371 (c)(1),
(2) Date: Aug. 25, 2015

(87) PCT Pub. No.: WO2014/133080
PCT Pub. Date: Sep. 4, 2014

(65) Prior Publication Data
US 2016/0010674 A1    Jan. 14, 2016

(30) Foreign Application Priority Data

Feb. 27, 2013 (JP) .................. 2013-036519

(51) Int. Cl.
  *B43K 7/12* (2006.01)
  *F16B 2/10* (2006.01)
  (Continued)

(52) U.S. Cl.
  CPC ............ *F16B 2/10* (2013.01); *A45D 34/04* (2013.01); *B43K 24/163* (2013.01); *B43K 25/02* (2013.01);
  (Continued)

(58) Field of Classification Search
  CPC .... B43K 25/02; B43K 25/024; B43K 25/028; B43K 23/126
  (Continued)

(56) References Cited

U.S. PATENT DOCUMENTS

| 7,527,448 | B2 * | 5/2009 | Ono ..................... | B43K 25/02 24/11 M |
| 8,425,135 | B2 * | 4/2013 | Rolion .................. | B43K 15/00 401/131 |

FOREIGN PATENT DOCUMENTS

| AE | 49117130 | 7/1974 |
| JP | 55148990 | 10/1980 |

(Continued)

OTHER PUBLICATIONS

First Office Action mailed Apr. 29, 2016 issued in Chinese Application No. 201480011031.5.
(Continued)

*Primary Examiner* — Jennifer C Chiang
(74) *Attorney, Agent, or Firm* — Adams & Wilks

(57) ABSTRACT

A clip attaching structure includes a clip supporting portion which protrudes on an outer circumferential surface of a main body, a clip, and a coil spring. The clip is configured to be rotatable with respect to a fulcrum at which the clip is engaged with the clip supporting portion. The convex portion is inserted into an inside of one end portion of the coil spring, and the other end portion of the coil spring abuts against the outer circumferential surface of the main body. A base portion of the convex portion has an outer diameter greater than an inner diameter of the coil spring, and a tip end portion of the convex portion has an outer diameter smaller than the inner diameter of the coil spring.

20 Claims, 46 Drawing Sheets

(51) Int. Cl.
*A45D 34/04* (2006.01)
*B43K 24/16* (2006.01)
*B43K 27/08* (2006.01)
*B43K 25/02* (2006.01)

(52) U.S. Cl.
CPC ............ *B43K 25/028* (2013.01); *B43K 27/08* (2013.01); *B43K 25/024* (2013.01)

(58) Field of Classification Search
USPC .................................................. 401/104, 131
See application file for complete search history.

(56) References Cited

FOREIGN PATENT DOCUMENTS

| | | | |
|---|---|---|---|
| JP | 56159283 | 11/1981 | |
| JP | 62131888 | 8/1987 | |
| JP | 63100292 | 6/1988 | |
| JP | 7172093 | 7/1995 | |
| JP | 2006130800 | 5/2006 | |
| JP | 2007118220 | 5/2007 | |
| JP | 2008188966 | 8/2008 | |
| JP | WO2010024346 A1 * | 3/2010 | ............. B43K 24/18 |
| JP | 2010083069 | 4/2010 | |

OTHER PUBLICATIONS

Second Office Action dated Dec. 30, 2016, issued in Chinese Patent Application No. 201480011031.5 together with English-language translation thereof.
Third Office Action issued Jun. 20, 2017 in Chinese Application No. 201480011031.5 and English translation thereof.

* cited by examiner

ATTACHMENT STRUCTURE FOR CLIP

TECHNICAL FIELD

The present invention relates to a clip, and particularly relates to a clip attaching structure in which the clip is linked to a main body or the like of a writing instrument to be freely rotatable around a fulcrum, a tip end side of the clip abuts against an outer circumferential surface of the main body or the like, and a back end side of the clip is constantly repulsed to be separated from the outer circumferential surface of the main body or the like.

BACKGROUND ART

A clip attaching structure is known in the related art in which a clip is linked to a main body, such as a long shaft tube which is elongated in a back-and-forth direction to be freely rotatable around a fulcrum or the like, a tip end side of the clip abuts against an outer circumferential surface of the shaft tube or the like, a back end side of the clip is constantly repulsed to be separated from the outer circumferential surface of the shaft tube or the like.

In the clip attaching structure, a coil spring is used as a repulsive member.

For example, in PTL 1, a structure is disclosed in which an end portion of a coil spring is fitted to a concave portion which is provided in one of a clip inner surface and a clip supporting body, and the other end portion of the coil spring abuts against the other plane surface among the clip inner surface and the clip supporting body.

CITATION LIST

Patent Literature

[PTL 1] JP-A-2010-83069

SUMMARY OF INVENTION

Technical Problem

In a structure which is disclosed in PTL 1, a concave portion is provided to cover an outer circumferential surface of a coil spring. However, in the structure of the PTL 1, since an outer diameter of the coil spring increase when the coil spring contracts in accordance with an opening and closing operation of a clip, an inner circumferential surface of a spring fitting concave portion and the outer circumferential surface of the coil spring come into contact with each other, and frictional resistance is generated. As a result, there is a concern that the opening and closing operation of the clip is disturbed.

Here, PTL 1 discloses that an opening portion side of the concave portion is formed so as to not come into contact with the outer circumferential surface of the coil spring so that frictional resistance when the coil spring expands and contracts decreases. However, since the spring fitting concave portion is provided to cover the outer circumferential surface of the coil spring, the outer circumferential diameter of the spring fitting concave portion becomes larger, and furthermore, since the clip or a clip supporting body which is provided with the spring fitting concave portion becomes larger, and design of the product is restricted.

Solution to Problem

According to the invention, there is provided a clip attaching structure, including: a clip supporting portion which is protruded on an outer circumferential surface of a main body; a clip which is engaged with the clip supporting portion; and a coil spring which biases one end portion of the clip in a direction of being separated from the outer circumferential surface of the main body, in which the clip is configured to be rotatable with respect to a fulcrum at which the clip is engaged with the clip supporting portion, in which the coil spring is provided being closer to the one end portion of the clip than the fulcrum, and biases the clip so that the other end portion of the clip abuts against the outer circumferential surface of the main body, in which the clip has a convex portion which is protruded towards the outer circumferential surface of the main body, from a surface of the clip which faces the outer circumferential surface of the main body, in which the convex portion is inserted into an inside of one end portion of the coil spring, and in which the other end portion of the coil spring abuts against the outer circumferential surface of the main body.

The clip attaching structure may be configured so that the outer circumferential surface of the main body has a plane portion, and the other end portion of the coil spring abuts against the plane portion.

The clip attaching structure may be configured so that an outer diameter of a base portion of the convex portion is greater than an inner diameter of the coil spring, and an outer diameter of a tip end portion of the convex portion is smaller than the inner diameter of the coil spring.

When the clip rotates by a predetermined amount in a direction in which the other end portion of the clip is separated from the outer circumferential surface of the main body, a tip end of the convex portion may abut against the outer circumferential surface of the main body.

A slit may be formed in the convex portion along a longitudinal direction of the clip.

A shape of the convex portion in a cross section which is orthogonal to a direction in which the convex portion is protruded may be a circular shape.

The main body may be a shaft tube of a writing instrument.

A slider may be provided in the main body in order to operate a pen tip of the writing instrument.

The clip attaching structure may be configured so that a plurality of sliders for operating a pen tip of the writing instrument are provided in the main body, and the clip supporting portion is provided in at least one of the sliders.

Advantageous Effects of Invention

In the present invention, the clip attaching structure, includes: the clip supporting portion which is provided to be protruded on the outer circumferential surface of the main body; the clip which is engaged with the clip supporting portion; and the coil spring which biases the one end portion of the clip in a direction of being separated from the outer circumferential surface of the main body, in which the clip is configured to be freely rotatable with respect to the fulcrum at which the clip is engaged with the clip supporting portion, in which the coil spring is provided being closer to the one end portion of the clip than the fulcrum, and biases the clip so that the other end portion of the clip abuts against the outer circumferential surface of the main body, in which the clip has the convex portion which is protruded towards the outer circumferential surface of the main body, from the surface of the clip which faces the outer circumferential surface of the main body, in which the convex portion is inserted into the inside of the one end portion of the coil spring, and in which the other end portion of the coil spring abuts against the outer circumferential surface of the main body. Accordingly, since frictional resistance of the coil spring in a clip opening and closing operation can be reduced, opening and closing operability of the clip is improved. In addition, there is no discomfort even when the clip is used in a main body which has a small outer shape dimension (which is thin), and not only a degree of freedom of a design of a clip main body, but also a degree of freedom of a design of the product itself can be improved.

DESCRIPTION OF EMBODIMENTS

Figure 1:
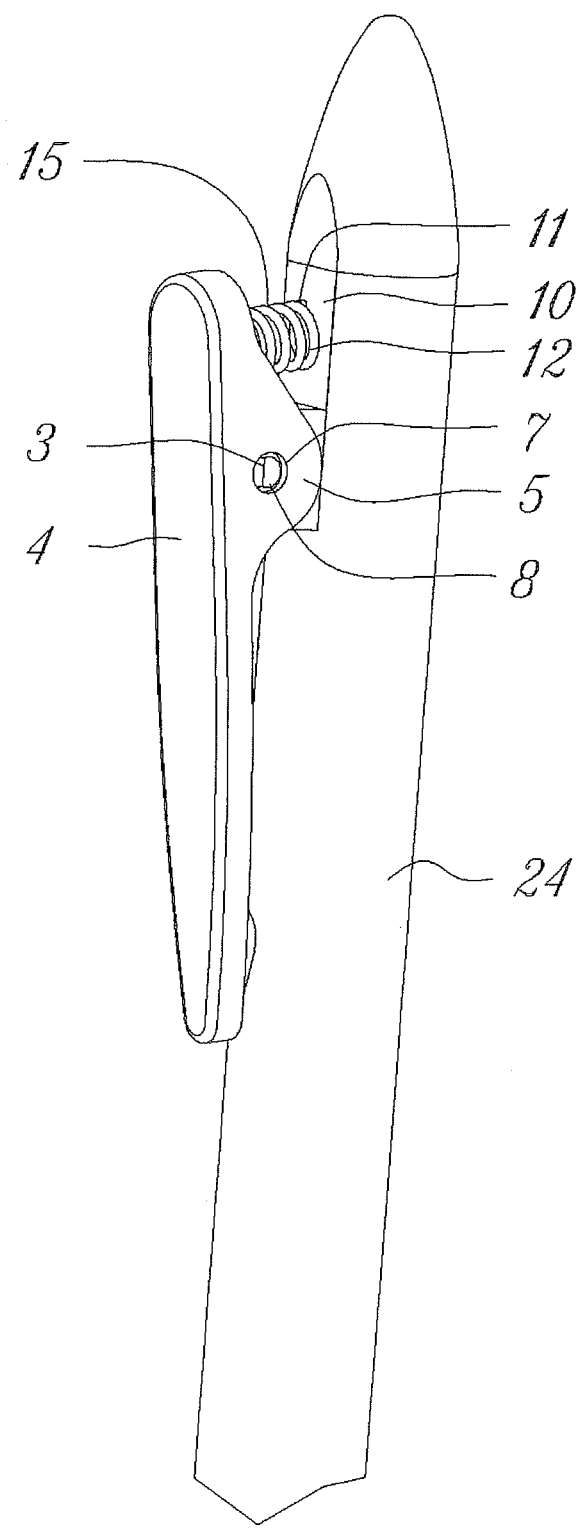
FIG. 1 is a perspective view illustrating a configuration of Embodiment 1 of the present invention.
Figure 2:
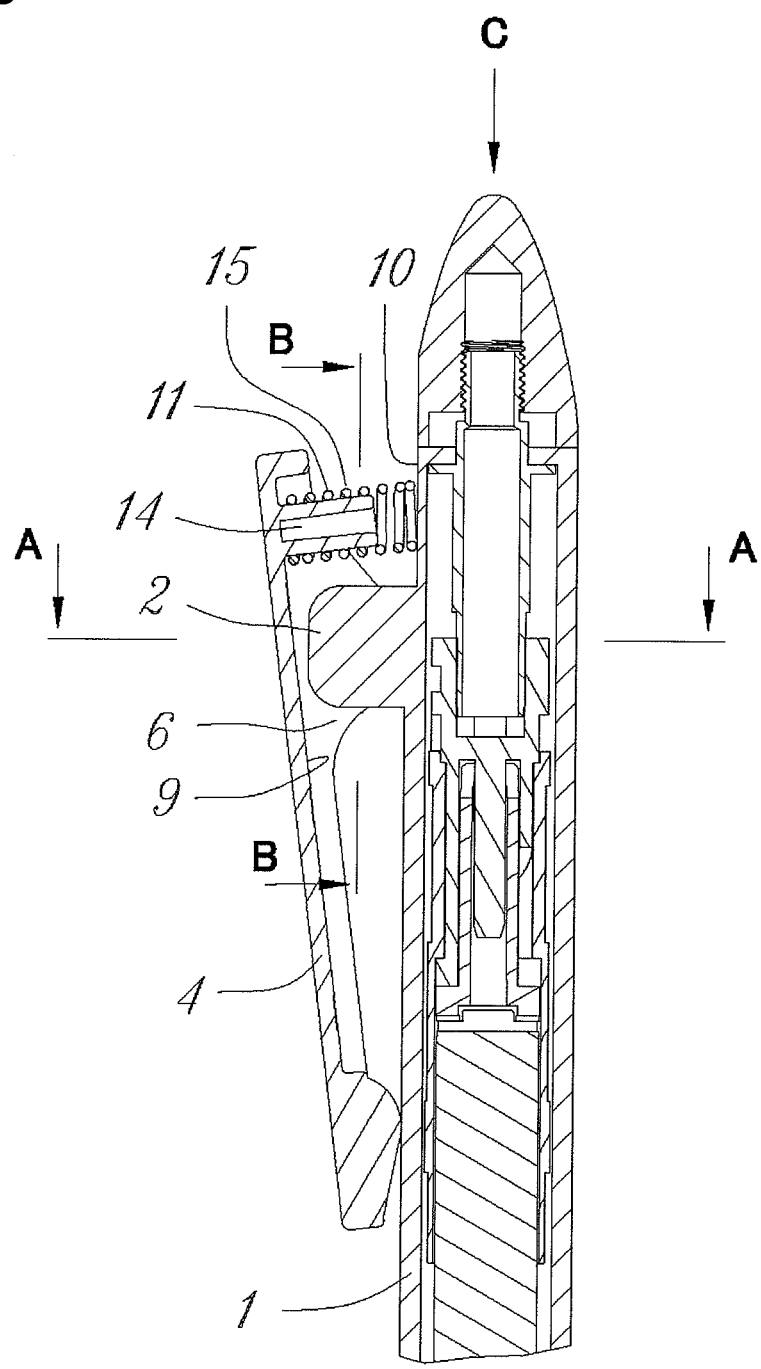
FIG. 2 is a longitudinal sectional view illustrating the configuration of Embodiment 1 of the present invention.
Figure 3:
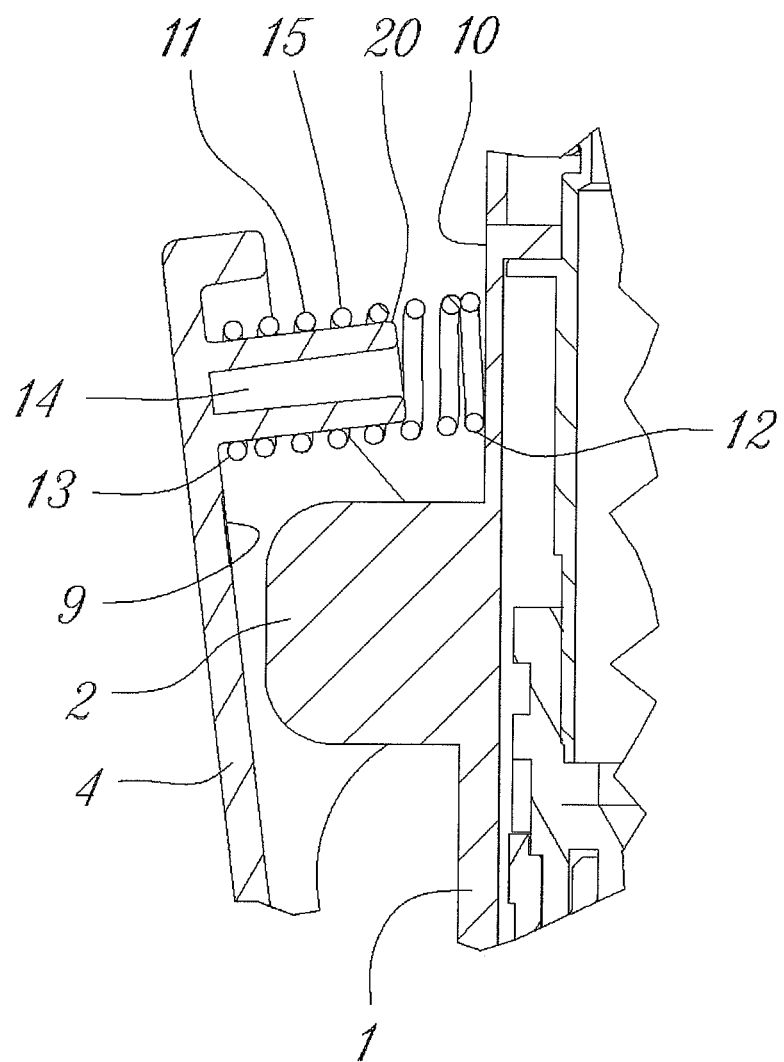
FIG. 3 is a partially enlarged view of FIG. 2.
Figure 4:
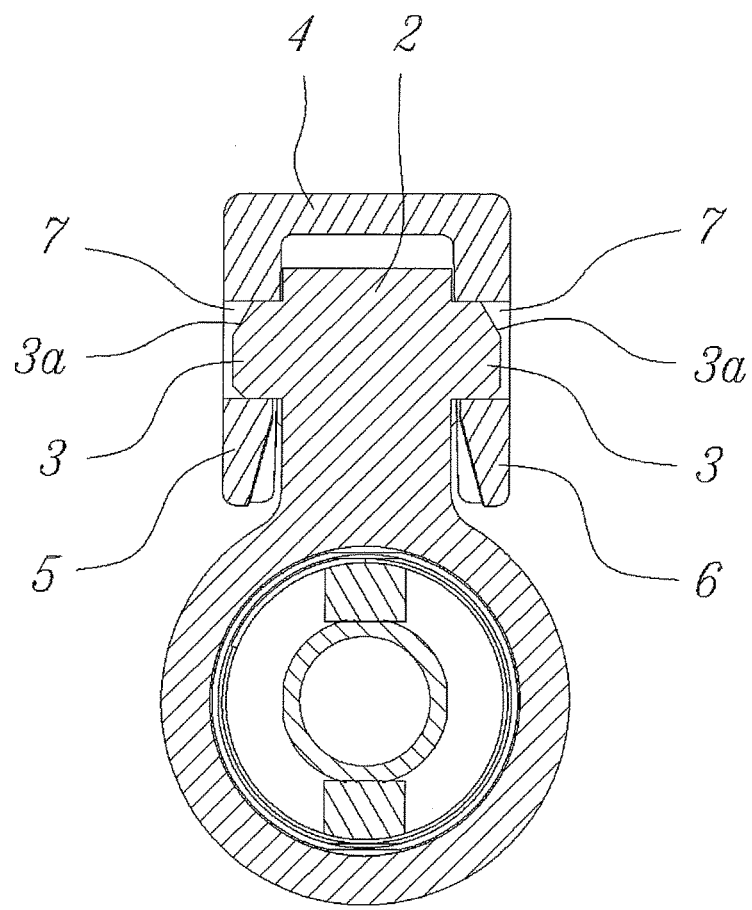
FIG. 4 is a sectional view along line A-A of FIG. 2.
Figure 5:
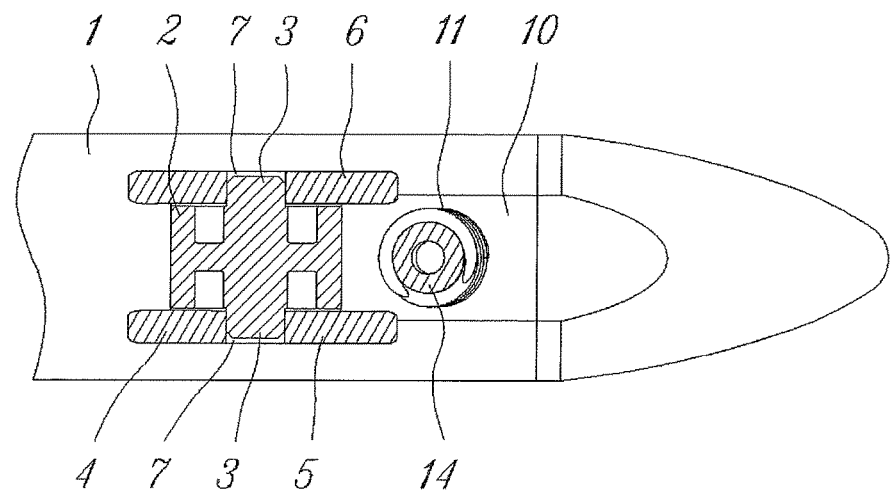
FIG. 5 is a sectional view along line B-B of FIG. 2.
Figure 6:
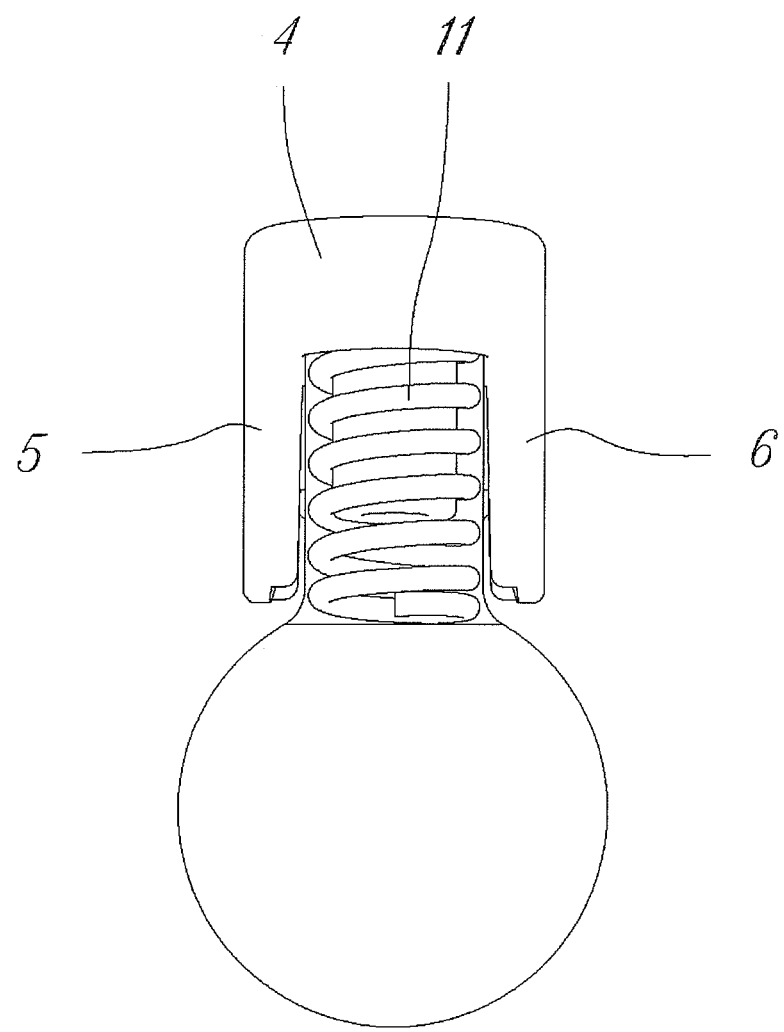
FIG. 6 is a view taken in the direction along arrow C of FIG. 2.

A configuration of a clip of the present invention will be described based on Embodiment 1 with reference to FIGS. 1 to 6. FIG. 1 is a perspective view illustrating a configuration of Embodiment 1 of the present invention. FIG. 2 is a longitudinal sectional view. FIG. 3 is a partial enlarged longitudinal sectional view. FIG. 4 is a sectional view along line A-A of FIG. 2. FIG. 5 is a sectional view along line B-B of FIG. 2. FIG. 6 is a view of arrow C of FIG. 2.

In addition, the present Embodiment is described by using a clip attaching structure in which the clip is attached to a shaft tube (main body) of a writing instrument, but the main body is not limited to the shaft tube of the writing instrument if the clip is necessary. For example, the main body may be an erasing instrument or a coating instrument. The writing instrument may be a ballpoint pen, a sharp pencil, a marking pen, or a fountain pen. The erasing instrument may be a correction pen or an eraser. The coating instrument may be glue or a cosmetic tool, such as eyeliner or an eyebrow pencil. In addition, a shape of the main body is not limited to a cylindrical shape, and for example, may be a shape of a square cylinder, a columnar shape, and a shape of a prism.

As illustrated in FIGS. 1 and 2, a main body 1 is a long member which is elongated in a back-and-forth direction. A pen tip which is not illustrated is provided at a front end of the main body 1. A clip supporting portion 2 is integrally provided in an outer circumferential portion on a back side of the main body 1. A clip main body 4 is rotatably (i.e., pivotably) engaged with the clip supporting portion 2. On left and right side surfaces of the clip supporting portion 2, a columnar fulcrum shaft 3 is provided to be protruded in a perpendicular direction with respect to a longitudinal direction of the main body 1.

The clip main body 4 is also a long member which is elongated in the back-and-forth direction. The clip main body 4 is configured to be freely rotatable with respect to a fulcrum at which the clip main body 4 is engaged with the clip supporting portion 2. A lateral cross section of the clip main body 4 is formed in a substantial U shape, and a right side plate portion 5 and a left side plate portion 6 are provided to face the left and right side surfaces of the clip supporting portion 2. A fulcrum hole 7 is provided to be open in the right side plate portion 5 and the left side plate portion 6, and constitutes a rotating (i.e., pivoting) fulcrum 8 which is engaged with the fulcrum shaft 3 and supports the clip main body 4 to be freely rotatable.

Furthermore, as illustrated in FIG. 4, in the vicinity of an end portion of the fulcrum shaft 3, a tapered surface portion 3a which narrows in a direction of being separated from the main body 1 is formed. When the fulcrum hole 7 of the clip main body 4 is assembled to the fulcrum shaft 3, the tapered surface portion 3a makes it easy to perform an assembly operation.

As illustrated in FIGS. 1 to 3, a coil spring 11 is provided between the outer circumferential portion of the main body 1 and the clip main body 4. The coil spring 11 biases one end portion of the clip main body 4 in the direction of being separated from an outer circumferential surface of the main body 1. In addition, the coil spring 11 is provided being closer to the one end portion side of the clip main body 4 than a fulcrum so that the other end portion of the clip main body 4 abuts against the outer circumferential surface of the main body 1.

In the outer circumferential portion of the main body 1 on the back side rather than the clip supporting portion 2, a plane portion 10 is provided to face an inner bottom surface 9 of the clip main body 4. One end portion 12 of the coil spring 11 abuts against the plane portion 10.

In addition, the clip main body 4 is provided with a cylindrical convex portion 14 which is protruded towards the plane portion 10 of the main body 1, from a back side portion of the inner bottom surface 9 of the clip main body 4 which faces the outer circumferential surface of the main body 1. The other end portion 13 of the coil spring 11 is inserted from the outside to cover the convex portion 14. In other words, the convex portion 14 is inserted into the inside of the other end portion 13 of the coil spring 11. The one end portion 12 which abuts against the plane portion 10 and the other end portion 13 which abuts against the inner bottom surface 9 constitute a repulsive portion 15. In other words, by a bias force of the coil spring 11, a back side portion (one end portion of the clip main body 4) is repulsed more than the rotating fulcrum 8 of the clip main body 4 to be separated from the outer circumferential surface of the main body 1, and a front side portion (the other end portion of the clip main body 4) is repulsed more than the rotating fulcrum 8 of the clip main body 4 to abut against the outer circumferential surface of the main body 1 via the rotating fulcrum 8. In this configuration, by pressing the back side portion more than the rotating fulcrum 8 of the clip main body 4 towards a shaft line from an outer diameter direction of the main body 1 against the bias force of the coil spring 11, the clip can perform an opening and closing operation and rotate so that the front side portion is separated more than the rotating fulcrum 8 of the clip main body 4 from the outer circumferential surface of the main body 1 via the rotating fulcrum 8.

Furthermore, in the present Embodiment, the clip main body 4 is configured of a material which is made of a colored opaque resin, and is molded by injection molding or the like. However, if a configuration of the present invention is possible, it does not particularly matter what material is used and any material, such as a metal, may be used.

In addition, as described above, by inserting the coil spring 11 from the outside to cover the convex portion 14, the coil spring 11 is prevented from being separated from an attaching position to the clip main body 4 while in use.

Furthermore, as the coil spring 11 contracts according to the opening and closing operation of the clip main body 4, an inner diameter and an outer diameter of the coil spring 11 increase. However, at this time, an interval between the outer circumferential surface of the convex portion 14 and the inner circumferential surface of the coil spring 11 widens, and a contact area between the convex portion 14 and the coil spring 11 decreases. As a result, the frictional resistance decreases, and a comfortable opening and closing operation is possible.

In the present Embodiment, the one end portion 12 of the coil spring 11 is in a free state, and can be freely displaced. For this reason, the one end portion 12 of the coil spring 11 slidingly abuts against the outer circumferential surface of the main body 1 to be freely movable along the outer circumferential surface of the main body 1.

For this reason, when assembling the writing instrument, regarding the clip main body 4 side, it is necessary to match the position of the other end portion 13 of the coil spring 11 to the position of the convex portion 14. However, regarding the main body 1 side, it is not necessary to match the position of the one end portion 12 of the coil spring 11 to a certain position. For this reason, assembly of the writing instrument becomes easy. In addition, when the opening and closing operation of the clip main body 4 is performed, the one end portion 12 of the coil spring 11 can freely move, and excessive resistance is unlikely to be applied to the coil spring 11. For this reason, durability of the coil spring 11 is improved.

In addition, in the present Embodiment, the outer circumferential surface against which the one end portion 12 of the coil spring 11 abuts is the plane portion 10. A contact area with respect to the plane portion 10 of the coil spring 11 increases, a force which is applied from the coil spring 11 with respect to the outer circumferential surface of the main body 1 is dispersed, and a scratch or a recess is unlikely to be generated in an external appearance of the outer circumferential surface of the main body 1.

Figure 42:
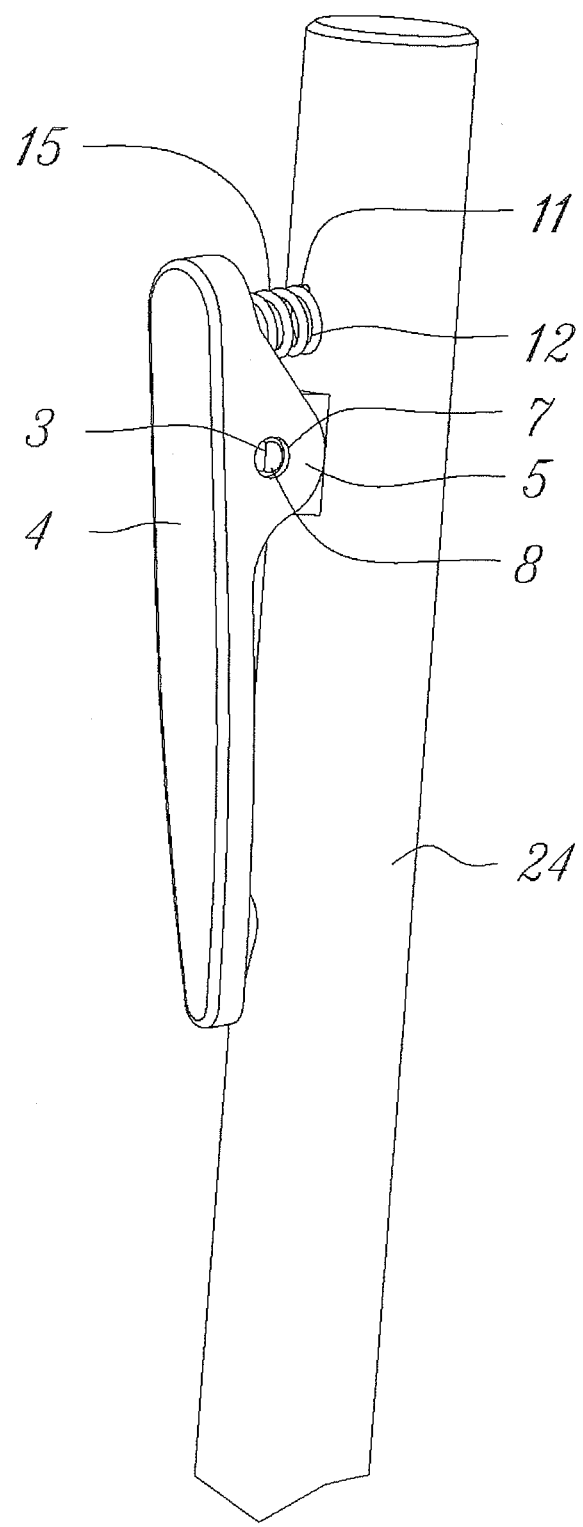
FIG. 42 is a perspective view illustrating a first modification example of Embodiment 1 and Embodiment 2 of the present invention.

In the present Embodiment, on the outer circumferential surface of the main body 1, a part against which the one end portion 12 of the coil spring 11 abuts is a plane (plane portion 10), but as described in a first modification example illustrated in FIG. 42, this part may be a curved surface. In an example illustrated in FIG. 42, the one end portion 12 of the coil spring 11 is allowed to be able to abut against a curved part of the outer circumferential surface of the cylindrical main body 1.

In addition, in FIG. 42, the part against which the one end portion 12 of the coil spring 11 abuts is a curved surface which is curved in a circumferential direction of the cylindrical main body 1. However, the part may be a curved surface which is curved in a direction of a shaft, or may be a curved surface which is curved in the circumferential direction and in the shaft direction, and each part can be configured of an arbitrary curved surface.

In addition, the outer diameter of the convex portion 14 can be smaller than the inner diameter of the coil spring 11.

In this case, since the contact area between the outer circumferential surface of the convex portion 14 and the inner circumferential surface of the coil spring 11 is further reduced, an aspect which is desirable for a more comfortable opening and closing operation is realized.

Furthermore, a tapered shape in which the outer diameter of the convex portion 14 gradually decreases towards the tip end portion which is provided to be protruded is also possible. In this case, the outer circumferential surface of the convex portion 14 and the inner circumferential surface of the coil spring 11 are separated from each other as being close to the vicinity of the tip end portion, and not only the aspect which is desirable for a more comfortable opening and closing operation, but also improvement of separability as a falling-out taper which is provided in molding in a case of molding the clip main body 4 by injection molding, can be improved.

In addition, since the convex portion 14 is included in the coil spring 11 as described above, the outer diameter of the coil spring 11 becomes the outermost diameter of the repulsive portion 15, and the size of the repulsive portion 15 can be small. Furthermore, it is also possible to make the clip main body 4 which accommodates the repulsive portion 15 in the substantial U-shaped inner surface portion small. In particular, it is possible to reduce the width of the clip main body 4, and to improve a degree of freedom of a design of the clip main body 4.

Furthermore, the convex portion 14 is illustrated in a substantial cylindrical shape in order to prevent a recess (sink) which is generated by molding contraction caused by a material when molding is performed in FIG. 3, but may have a substantial columnar shape. In addition, a shape of a cross section (lateral cross section) which is orthogonal to a protruding direction is also not limited to a circular shape, and various shapes, such as not only a shape of a geometrical plane, including a polygonal shape, a shape of a cross, a star-shaped polygonal shape, but also a shape, including a shape which has a partial arc, can be employed. However, a shape may be appropriately selected in consideration of manufacturing cost or the like.

In addition, in the present Embodiment, an example in which the clip supporting portion 2 is provided on the outer circumferential surface of the main body 1 is described, but the present invention is not limited thereto. As described in a second modification example illustrated in FIG. 43, the clip main body 4 may be attached to the clip supporting portion 2 which is provided in a slider for operating a pen tip of the writing instrument, and the clip main body 4 may be slidable together with the slider. This structure will be described in detail as Embodiment 3 later.

Figure 44:
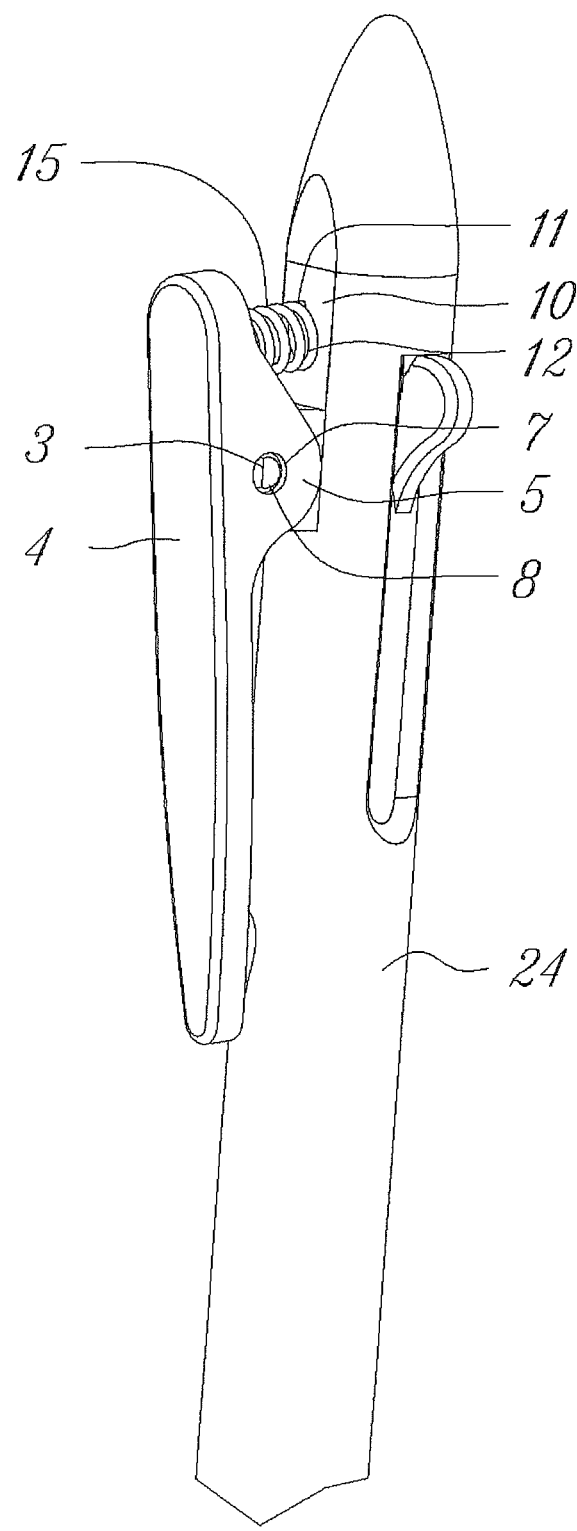
FIG. 44 is a perspective view illustrating a third modification example of Embodiment 1 and Embodiment 2 of the present invention.

In addition, the clip attaching structure of the present Embodiment may be provided in a multi-core writing instrument which has a plurality of refills, such as a ballpoint pen unit, a sharp unit, or a stylus pen unit, contained therein, as described in a third modification example illustrated in FIG. 44.

Figure 7:
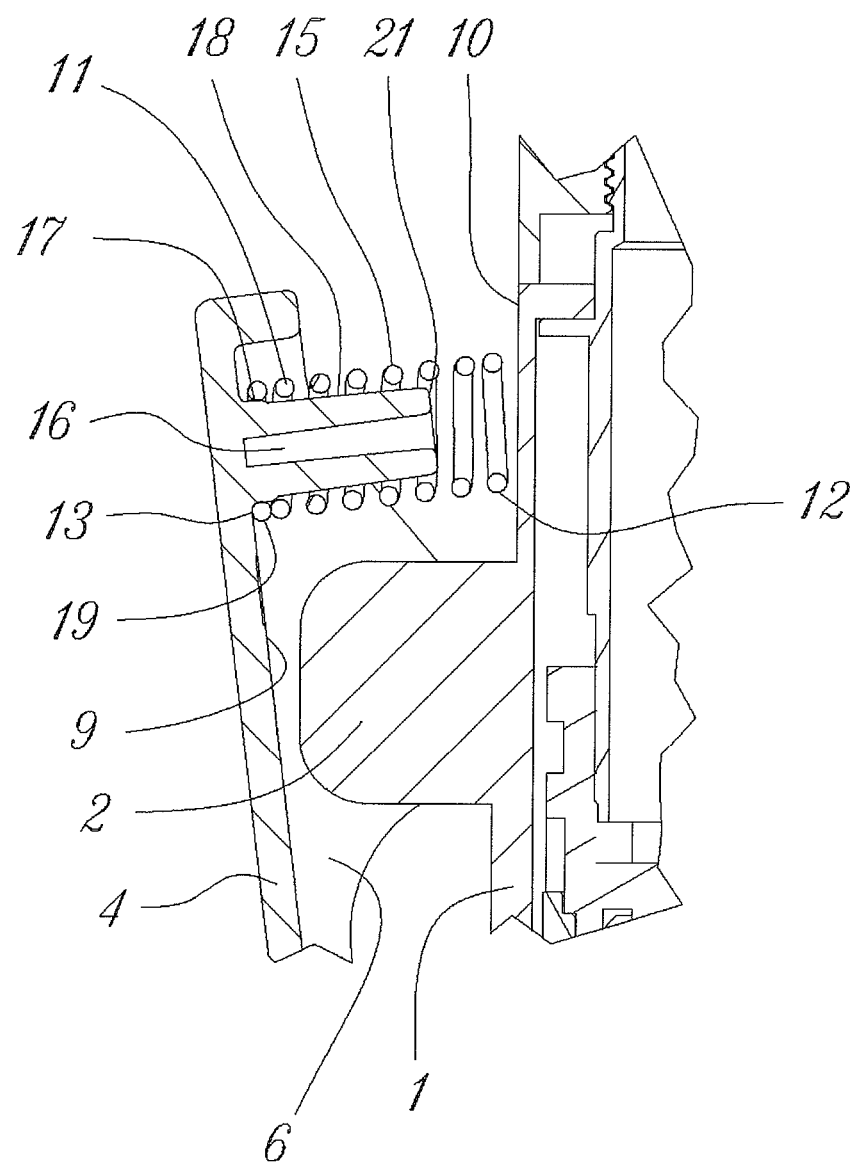
FIG. 7 is a partially enlarged longitudinal sectional view illustrating a configuration of Embodiment 2 of the present invention.
Figure 8:
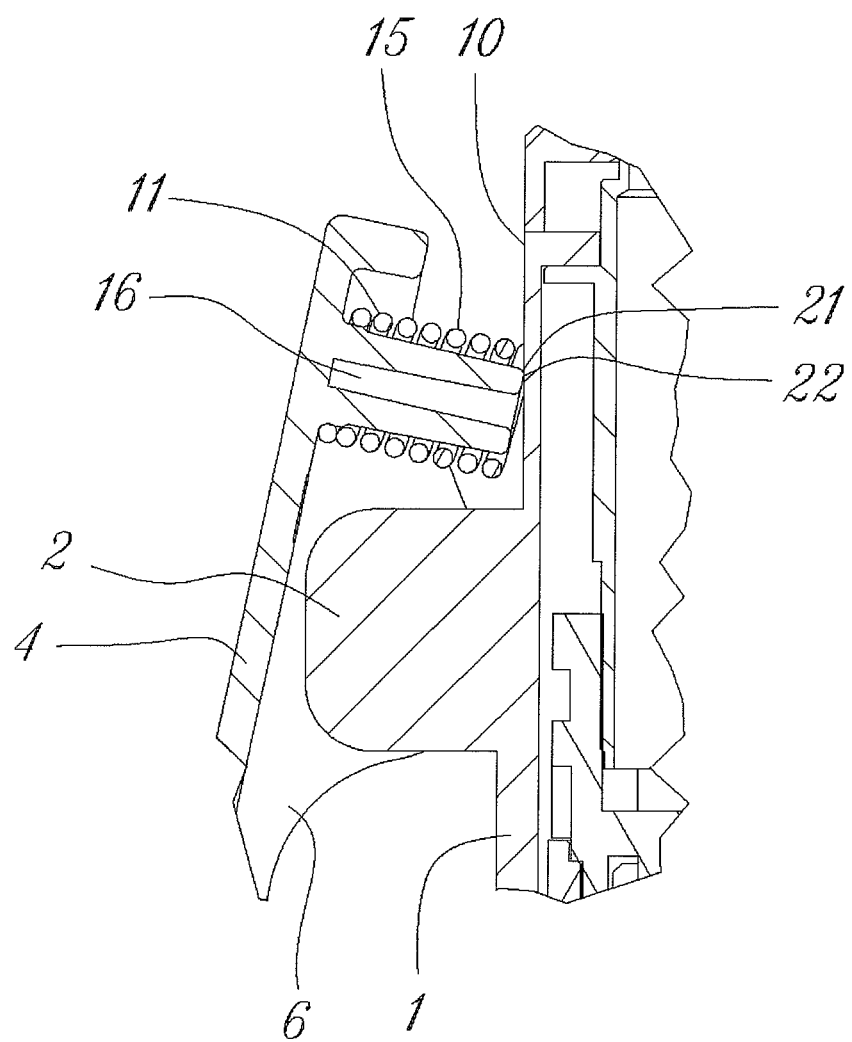
FIG. 8 is a partially enlarged longitudinal sectional view illustrating an operation of Embodiment 2 of the present invention.

Next, a clip structure of the present invention will be described based on Embodiment 2 with reference to FIGS. 7 and 8. FIG. 7 is a partially enlarged longitudinal sectional view illustrating a configuration of Embodiment 2 of the present embodiment. FIG. 8 is a partially enlarged longitudinal sectional view illustrating an operation of Embodiment 2 of the present embodiment.

Since the configuration is the same as that of Embodiment 1 except for a shape of the concave portion, the same shape and the material will be described in detail. In addition, in the present Embodiment, similarly to Embodiment 1, a modification example illustrated in FIGS. 42 to 44 can be employed.

In Embodiment 2, a large-diameter portion 17 of which the diameter is slightly greater than an inner circumferential diameter of the coil spring 11 is provided so that the outer circumferential surface of a base portion which is close to the inner bottom surface 9 of a convex portion 16 is pressure-welded to the inner circumferential surface of the coil spring 11. The end portion of the coil spring 11 is held in a state of being lightly pressed-in to the substantial entire circumference of the large-diameter portion 17. The length of the large-diameter portion 17 in the protruding direction is substantially the same dimension as a line diameter of the coil spring 11, and a tip end side in the protruding direction rather than the large-diameter portion 17 is a small-diameter portion 18 of which the outer diameter is smaller than that of the large-diameter portion 17. By allowing the small-diameter portion 18 to be separated from the inner circumferential surface of the coil spring 11, only a coiled seat portion 19 which is provided in the end portion of the coil spring 11 is pressure-welded. In this configuration, since it is possible not only to prevent a positional shift of the coiled seat portion 19 of the coil spring 11 during the clip opening and closing operation, but also to prevent the convex portion 16 and the coil spring 11 from coming into contact with each other during a process of the opening and closing operation of the clip main body 4, a comfortable opening and closing operation is possible.

In the present Embodiment, a shape of the cross section which is orthogonal to the protruding direction of the convex portion 16 is preferably a substantial circular shape. By making the shape of the cross section of the convex portion 16 a substantial circular shape, the end portion (coiled seat portion 19) of the coil spring 11 is pressure-welded in the substantial entire circumference of the large-diameter portion 17 (a lightly pressed-in state is held). Accordingly, it is possible to prevent a positional shift of the other end portion 13 of the coil spring 11 during the clip opening and closing operation. In addition, it is possible to further prevent the small-diameter portion 18 of the convex portion 16 and the coil spring 11 from coming into contact with each other during the process of the opening and closing operation of the clip, and to perform a more comfortable opening and closing operation of the clip. Furthermore, it is possible to more reliably hold the coil spring 11 substantially integrally with respect to the convex portion 16 when assembling the clip main body 4 to the clip supporting portion 2, and the assembly work is further improved.

Furthermore, it is desirable that the shape of the cross section in the large-diameter portion 17 of the convex portion 16 is a substantial circular shape, and an arbitrary shape may be employed in the small-diameter portion 18.

In addition, as the coiled seat portion 19 which is provided in the end portion of the coil spring 11 as described above is pressure-welded to the large-diameter portion 17 of the convex portion 16, by inserting the coil spring 11 onto the convex portion 16 from the outside and substantially integrally holding the coil spring 11 during assembly, the coiled seat portion 19 can be engaged with the clip supporting portion 2. As a result, there is also an effect of preventing the coil spring 11 from being disengaged and lost during the assembly work.

Furthermore, since the one end portion 12 of the coil spring 11 abuts against the plane portion 10 of the main body 1 as described above, when the coil spring 11 is assembled, it is not necessary to match the position to the position of the main body 1, and there is also an effect of performing the assembly work more simply.

In addition, as described above, since the clip main body 4 and the coil spring 11 are substantially integrated with each other during assembly, and engagement with the clip supporting portion 2 is performed from a centrifugal direction of the main body 1, the one end portion 12 of the coil spring 11 substantially perpendicularly abuts against the plane portion 10 of the main body 1. In this configuration, since it is possible to prevent the generation of a scratch in the longitudinal direction of the main body 1 to the plane portion 10 by the one end portion 12 of the coil spring 11 during assembly, there is an effect of excellently retaining the external appearance of the product. Furthermore, in the process of engagement, the right side plate portion 5 and the left side plate portion 6 of the clip main body 4 easily widen in a leftward and rightward direction by the tapered surface portion 3a (refer to FIG. 4) of the fulcrum shaft 3. According to this, the fulcrum hole 7 of the clip main body 4 can be easily engaged with the fulcrum shaft 3.

Furthermore, the convex portion 16 is illustrated as a substantial cylindrical shape for preventing a sink when molding is performed in FIG. 7, but may be a substantial columnar shape. In addition, the shape of the cross section (lateral cross section) which is orthogonal to the protruding direction is not limited to a circular shape, and various shapes, such as not only a shape of a geometrical plane, including a polygonal shape, a shape of a cross, a star-shaped polygonal shape, but also a shape, including a shape which has a partial arc, can be employed. Furthermore, the shapes of the large-diameter portion 17 and the small-diameter portion 18 can also be a combination of various sectional shapes, for example, a circular shape can be employed as a shape of a cross section of the large-diameter portion 17, and a polygonal shape can be employed as a shape of a cross section of the small-diameter portion 18. However, in consideration of manufacturing cost or the like, a shape may be appropriately selected.

Figure 9:
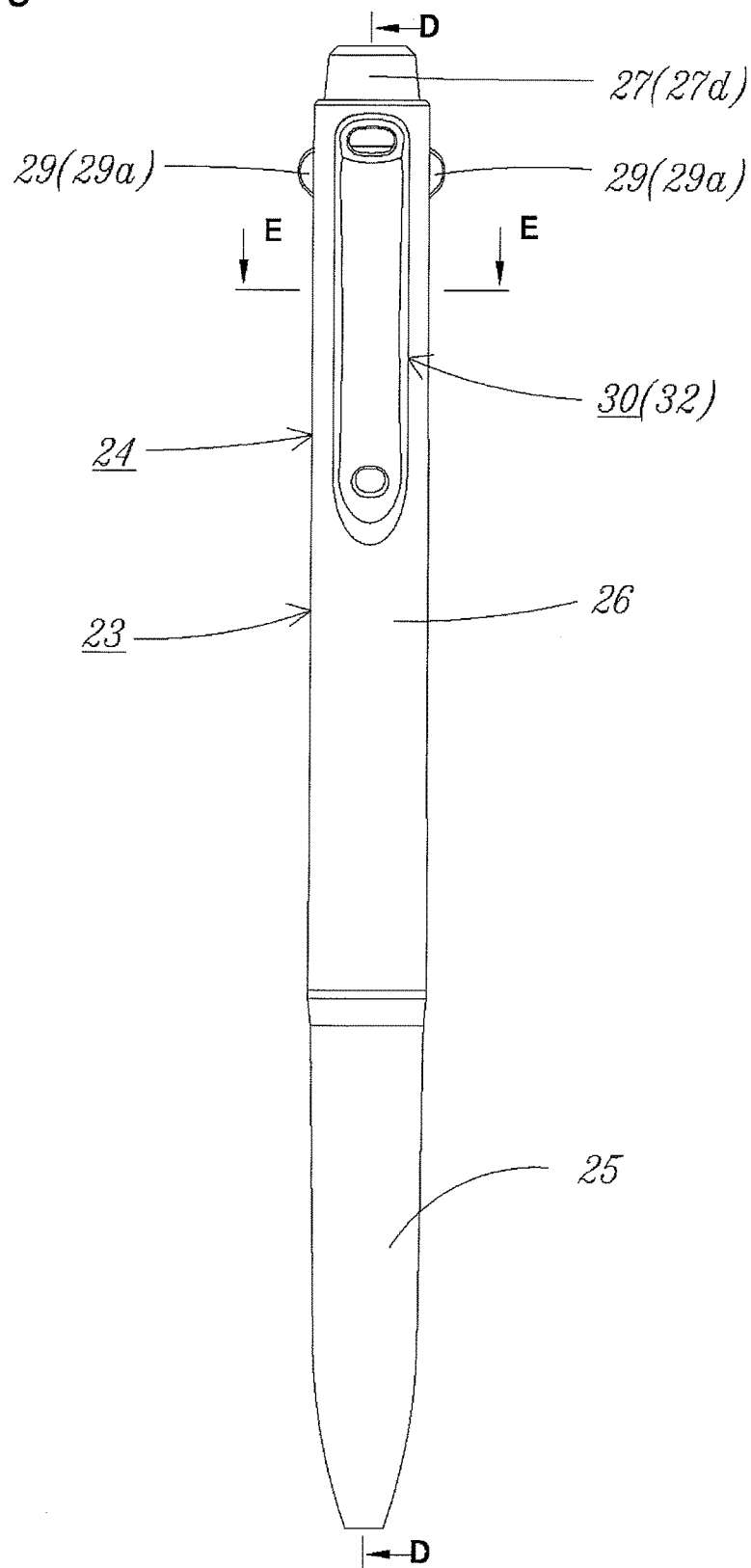
FIG. 9 is a front view of an entire multi-core writing instrument illustrating a configuration of Embodiment 3 of the present invention.
Figure 10:
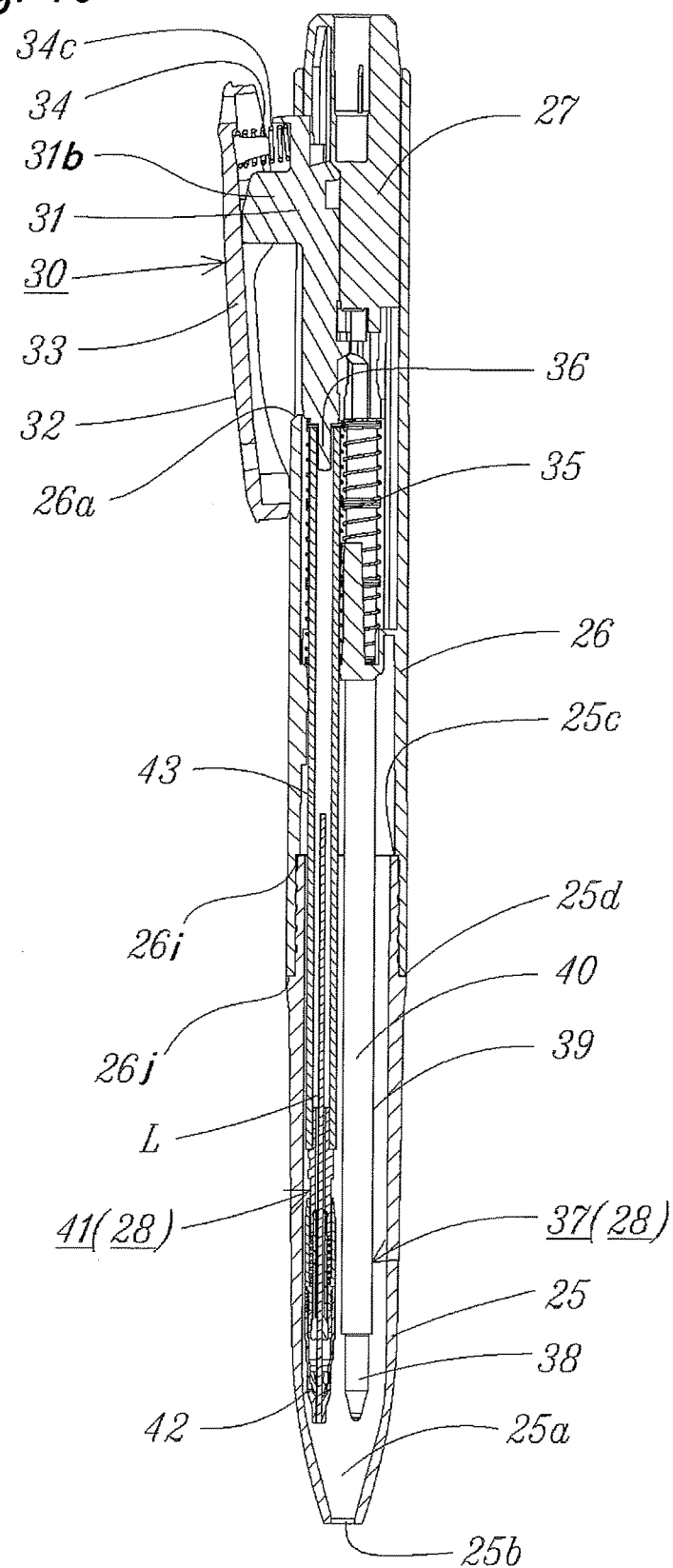
FIG. 10 is a longitudinal sectional view along line D-D of FIG. 9.
Figure 11:
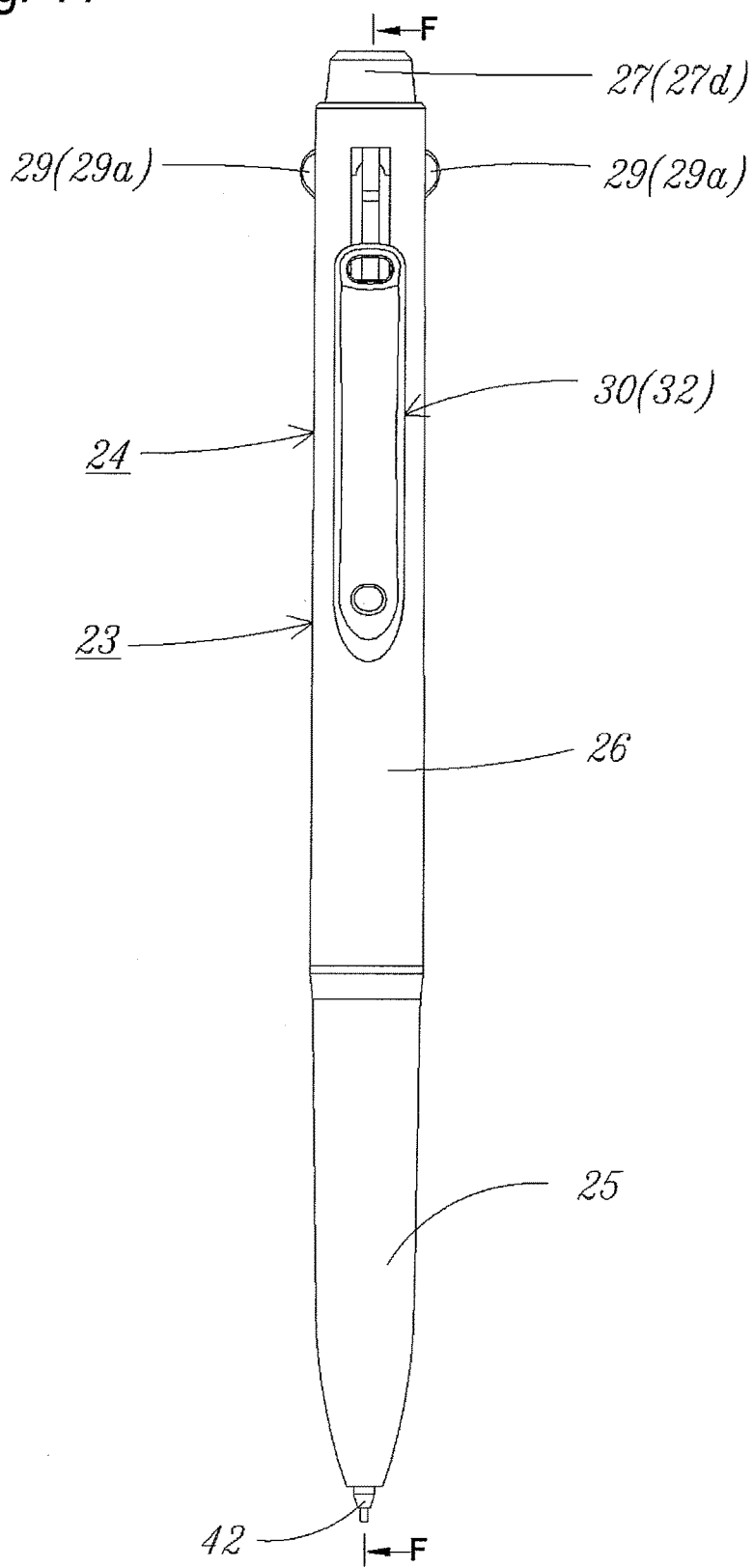
FIG. 11 is a front view of the entire multi-core writing instrument in a state where a tip member portion 42 is protruded.

Next, a configuration of the clip of the present invention will be described based on Embodiment 3 with reference to FIGS. 9 to 41. In Embodiment 3, the multi-core writing instrument which has a plurality of refills, such as a ballpoint pen unit, a sharp unit, or a stylus pen unit, contained therein is described, and the clip of the present invention is configured in the slider in which a front end is linked to a back end of the refill. FIG. 9 is a view illustrating the external appearance of the entire multi-core writing instrument which has a configuration of Embodiment 3 of the present invention. FIG. 10 is a longitudinal sectional view.

A shaft main body 23 in the present Embodiment includes a front shaft 25, a back shaft 26, and a slidable case 27. In the present Embodiment, a main body 24 includes the shaft main body 23, a slider 29 which is disposed in a window hole 26a (FIG. 24) of the back shaft 26, or a clip slider main body 31 (FIG. 24) which will be described later.

As illustrated in FIG. 10, in an inner diameter portion of the front shaft 25, a conical portion 25a of which the diameter gradually decreases towards the tip end side is formed. In addition, at the tip end of the front shaft 25, a protruded hole 25b in which a writing portion (pen tip 38) of a ballpoint pen unit 37 or a tip member portion 42 of a sharp unit 41 appears is formed.

Here, in addition to the ballpoint pen unit 37 or the sharp unit 41, a unit which includes the stylus pen unit or the like which can operate an eraser unit that sends out an eraser or a smartphone, and is embedded in the shaft main body 23, is generally called a refill 28.

The front shaft 25 considers visibility or designability of the refill 28 which is disposed inside thereof, and is configured of one component. However, a clip which is made of a rubber-shaped elastic body may be inserted, or a clip which is made of a rubber-shaped elastic body may cover the front shaft by means, such as two-color molding or multicolor molding. Accordingly, a comfortable grip, ease of writing, and fatigue reduction are improved.

Figure 13:
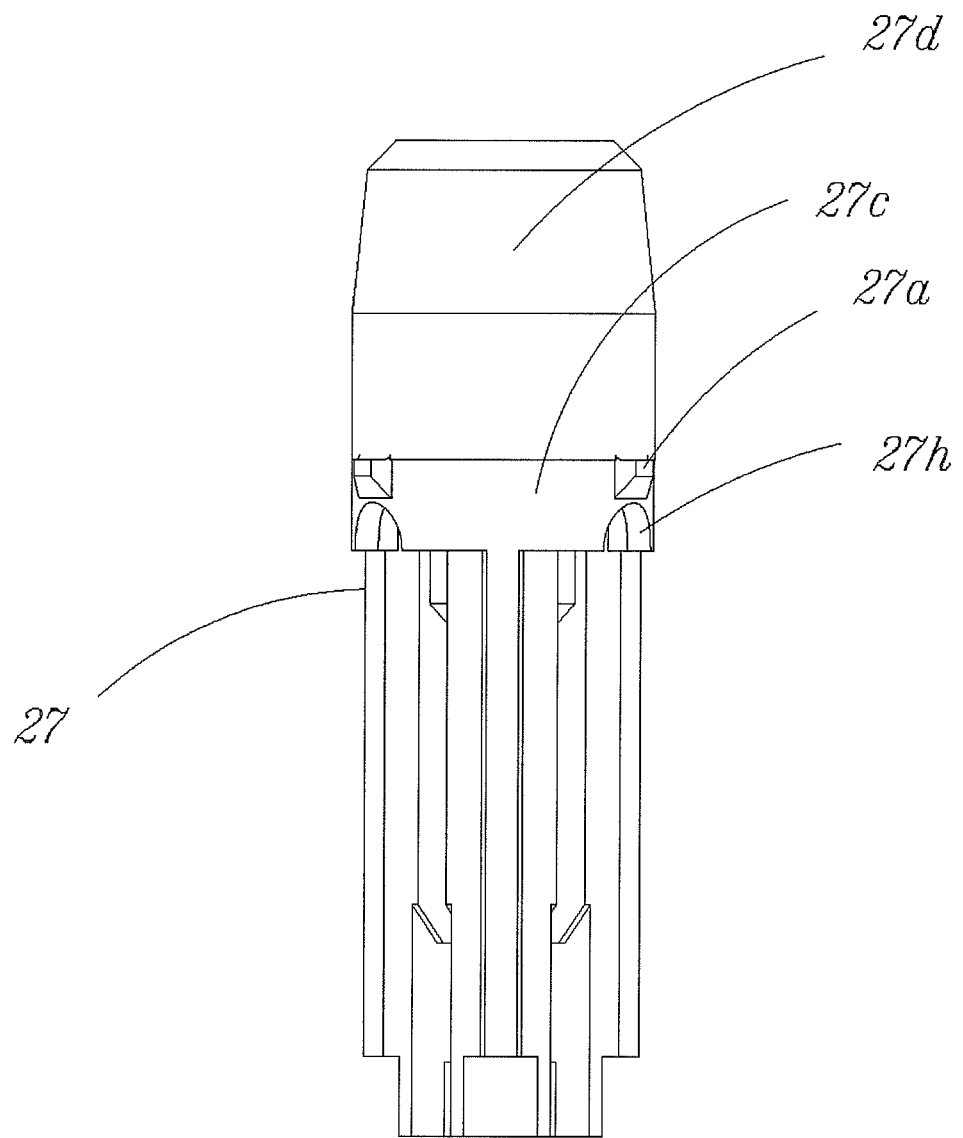
FIG. 13 is a front view of a slidable case 27.

The front shaft 25 and the back shaft 26 are attached to be detachable by screwing, and the slidable case 27 is attached to a back end portion of the back shaft 26. In the present Embodiment, on a front surface of an outer circumference of the slidable case 27, engagement projections 27a for engagement with the back shaft 26 are provided at an equivalent interval (FIG. 13). In addition, the engagement projection 27a is engaged with the back end portion of the window hole 26a (FIGS. 17, 18, and 24) which is provided on the front surface of the outer circumference of the back shaft 26. Accordingly, in the multi-core writing instrument which is combined with the sharp unit 41 as described in the present Embodiment, a slide distance of the slidable case 27 when a sharp core L is sent out by pressing the slidable case 27 is effectively utilized in the window hole 26a, and the length of the shaft main body 23 is suppressed.

Figure 14:
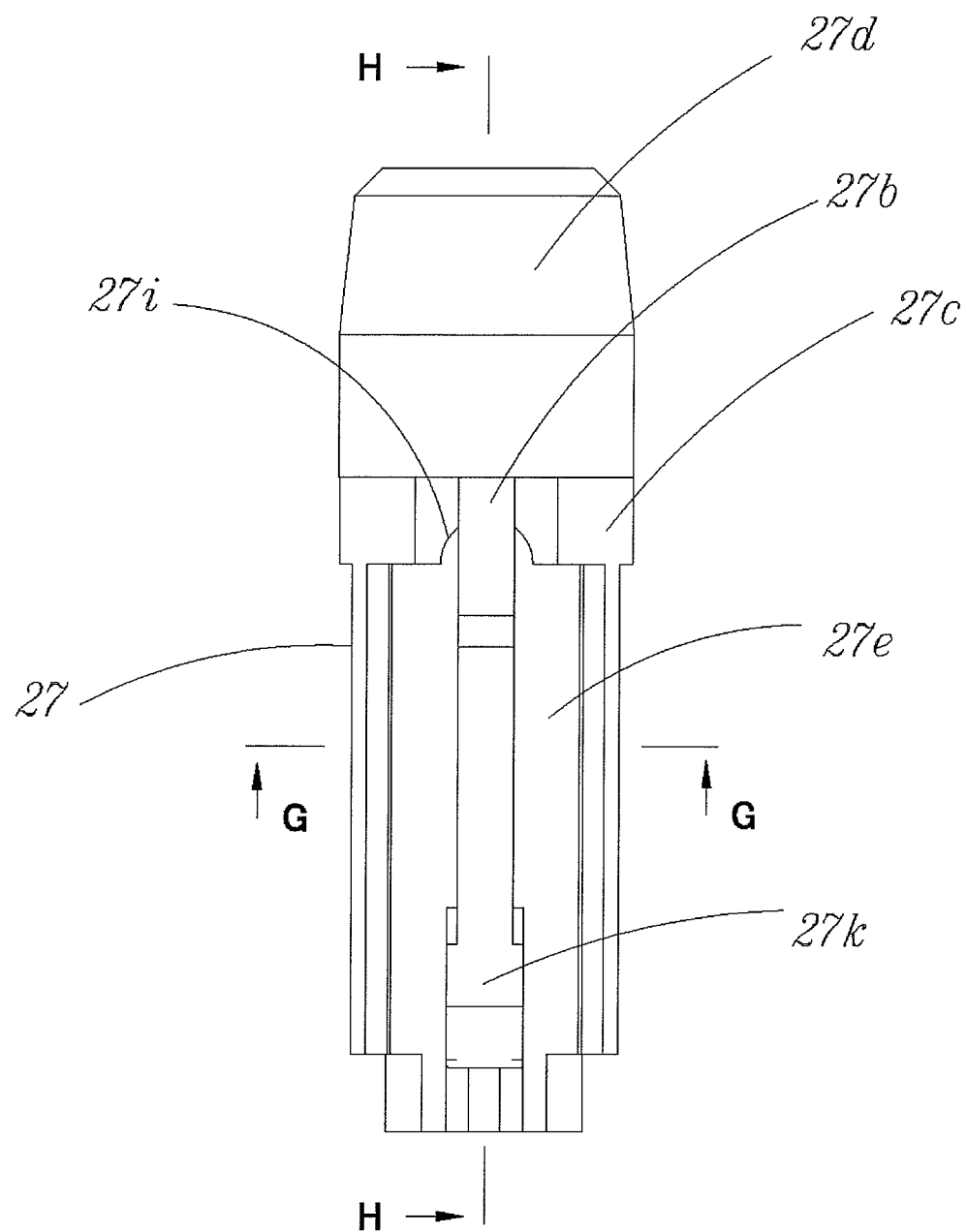
FIG. 14 is a rear view of the slidable case 27.

In addition, a cut-out portion 27b is provided only at one location on the outer circumferential surface of the slidable case 27 (FIG. 14). An apex 31a (FIG. 21) of the clip slider main body 31 of the slider (clip slider 30) which constitutes the clip of the present invention which will be described later is provided to be engageable. According to this, without damaging a shape of the clip slider 30, it is possible to slide similarly to the other slider 29.

Furthermore, in the present Embodiment, the ballpoint pen unit 37 is linked to the front end of the slider 29, and the sharp unit 41 is linked to the front end of the slider 29. Here, the clip slider 30 together with the slider 29 is a place for an operation of exchanging a writable state where the pen tip is protruded out of the front end of the main body 1 and an unwritable state where the pen tip is retraced in from the front end of the main body 1. A user can switch the writable state and the unwritable state by operating the clip slider 30 together with the slider 29.

Figure 19:
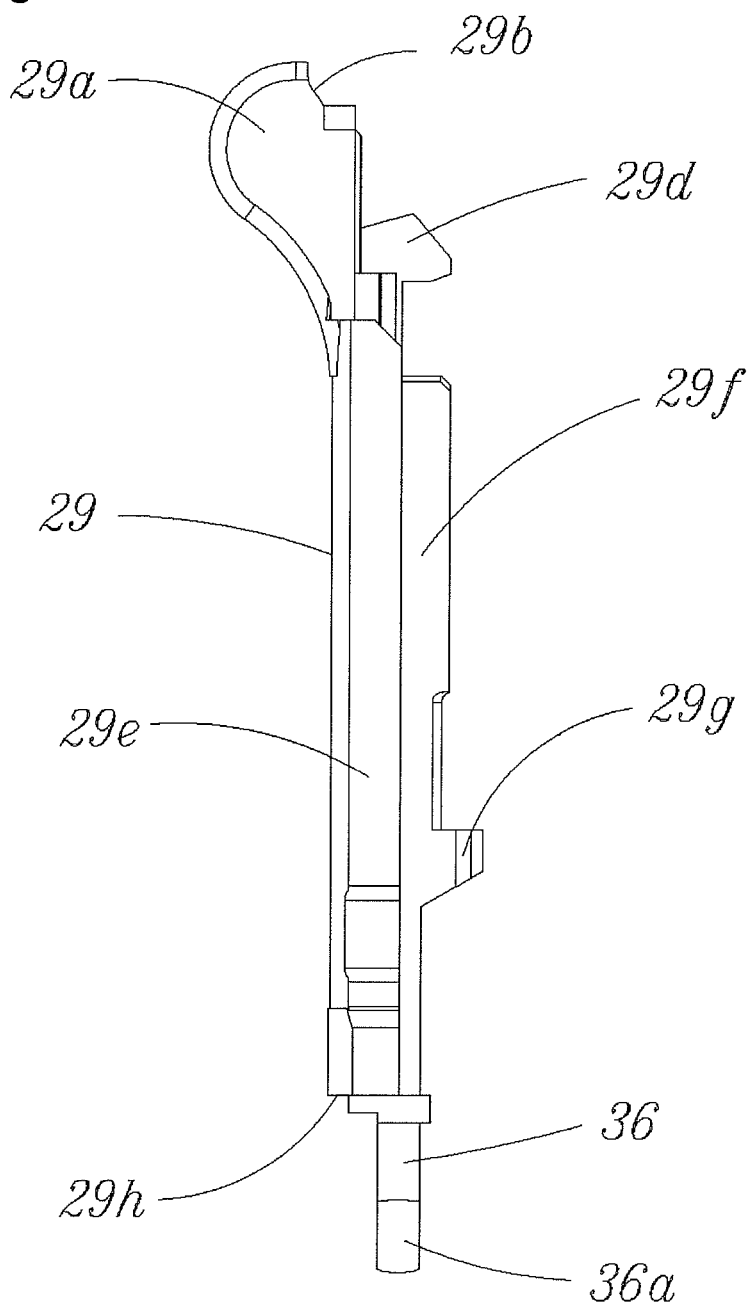
FIG. 19 is a right side view of a slider 29.
Figure 20:
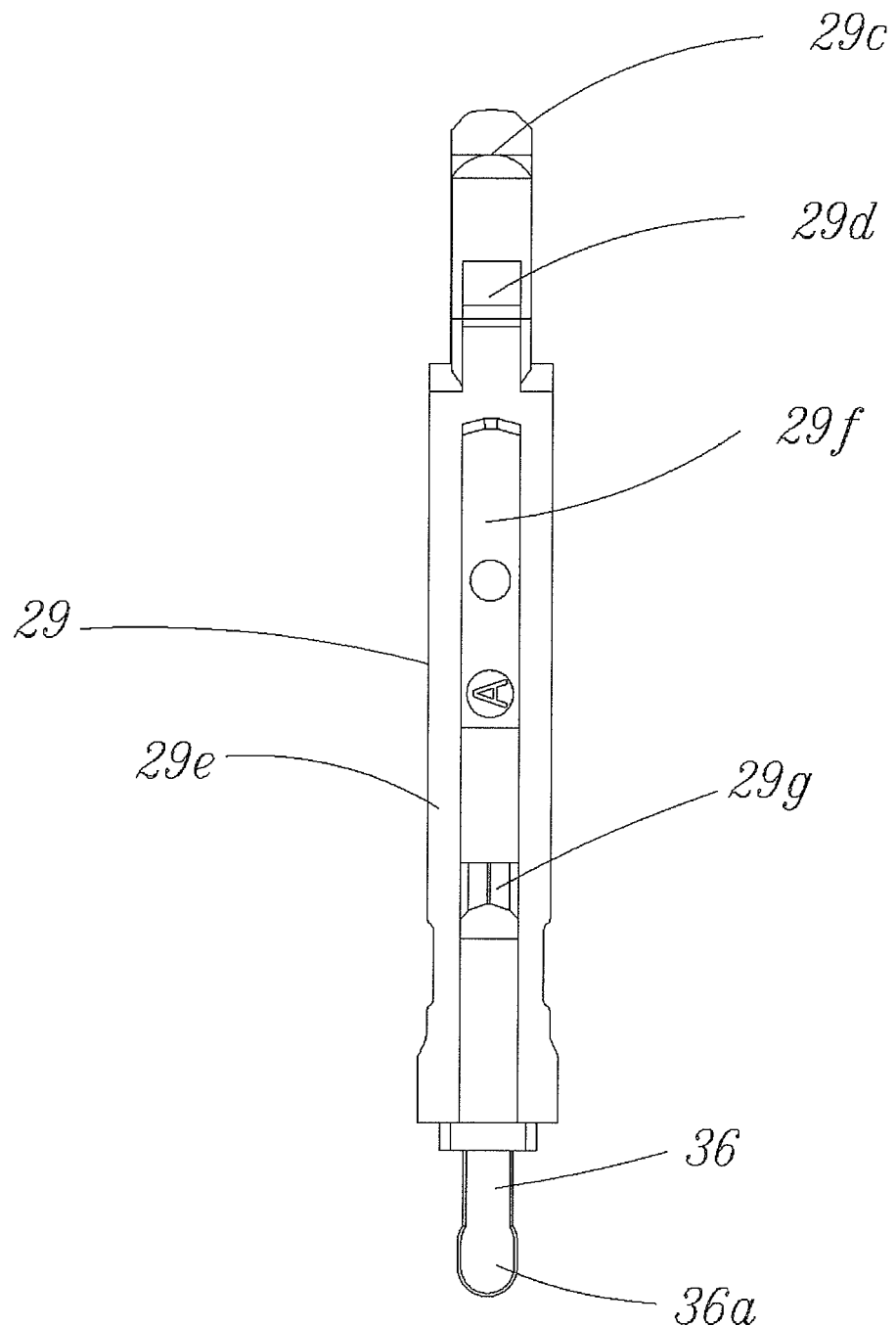
FIG. 20 is a rear view of the slider 29.

As illustrated in FIG. 19, a cut-out portion 29b is provided in a direction of a shaft center at a back end of a pressing portion 29a of the slider 29, and covers the engagement projection 27a (FIG. 13) of the slidable case 27 which is engaged with the back end portion of the above-described window hole 26a and makes the engagement projection 27a invisible from the external appearance.

Figure 21:
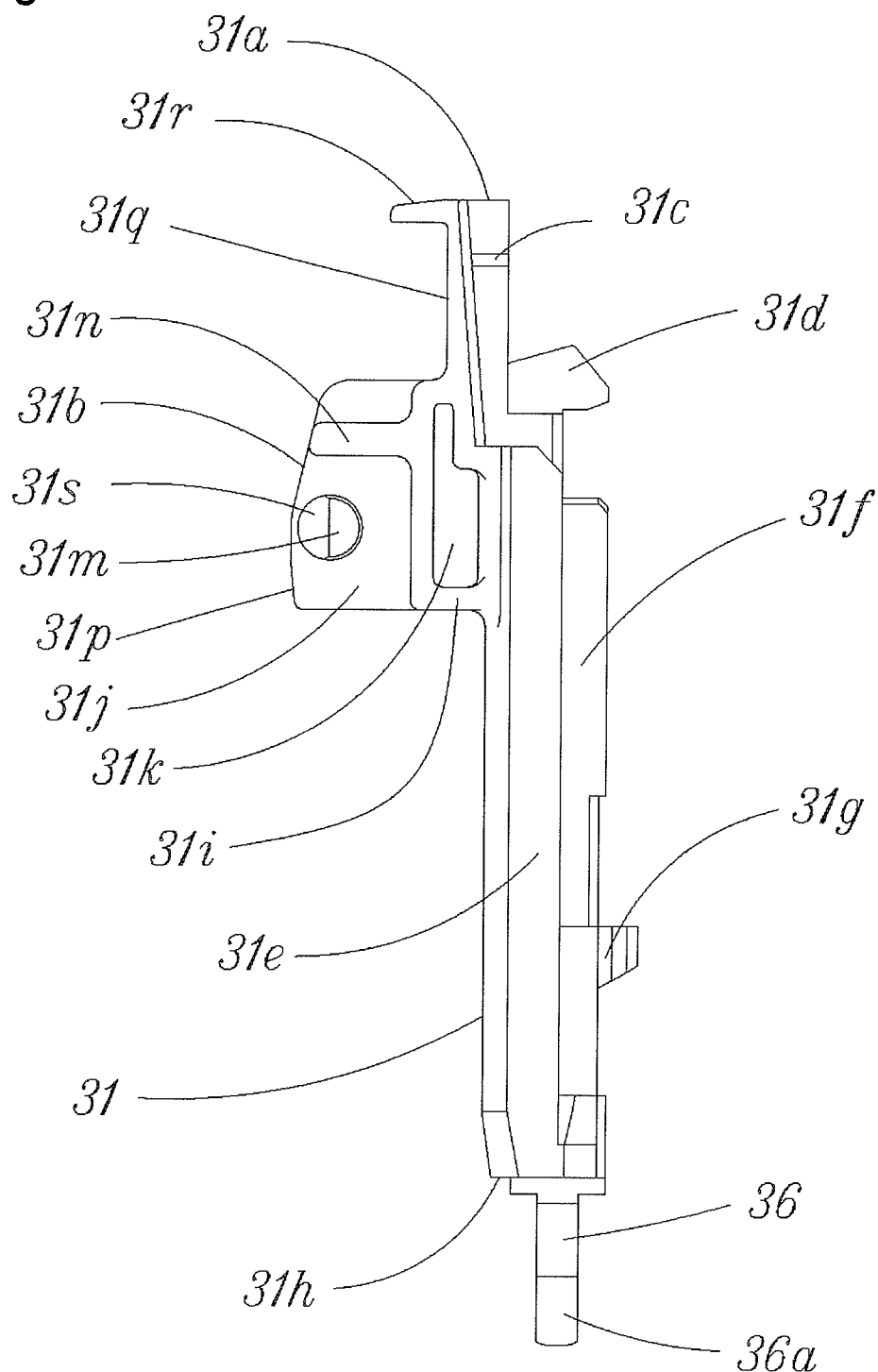
FIG. 21 is a right side view of a clip slider 30.
Figure 22:
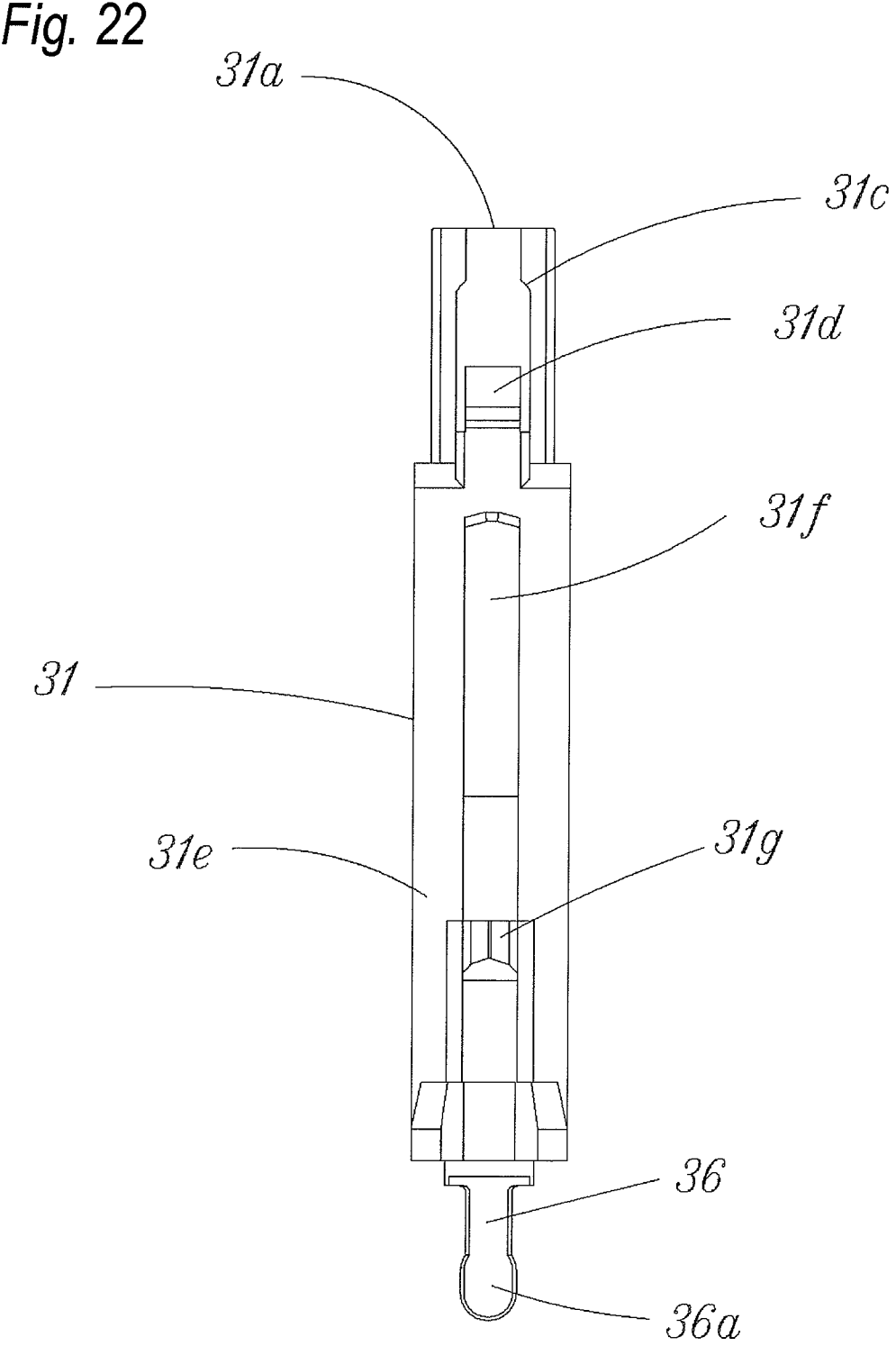
FIG. 22 is a rear view of the clip slider 30.
Figure 23:
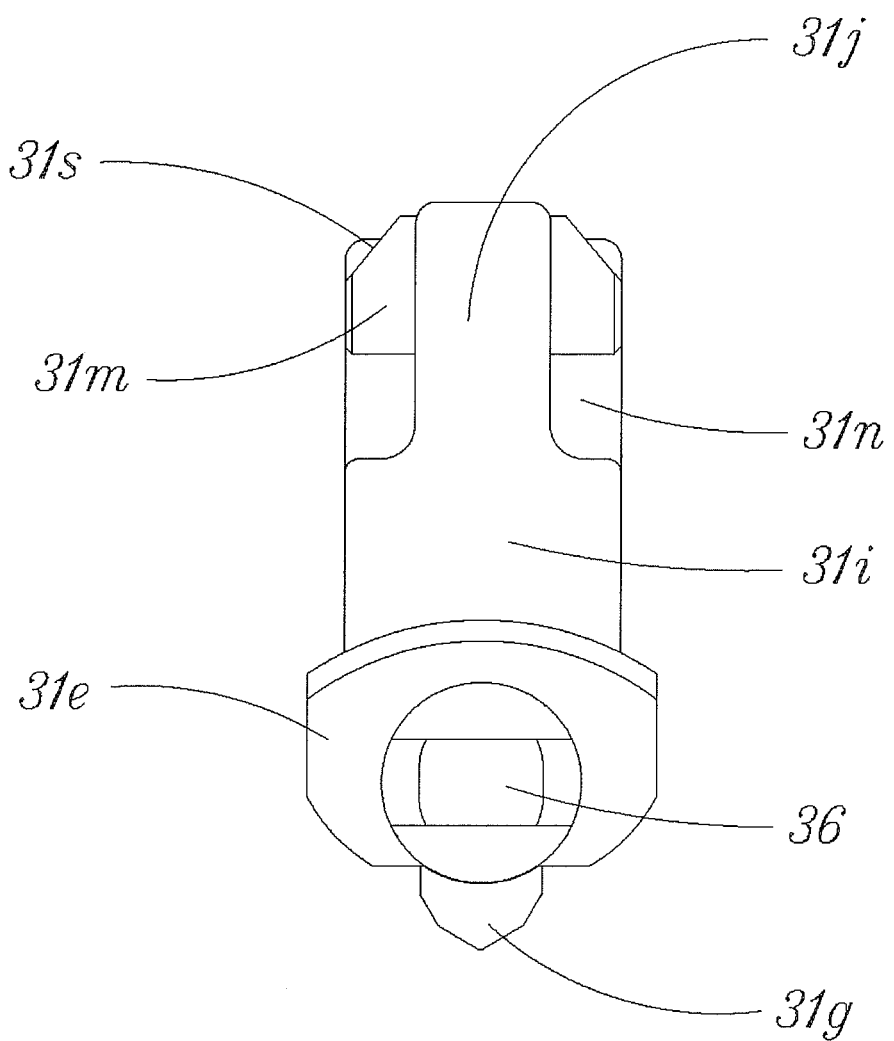
FIG. 23 is a bottom view of the clip slider 30.

In addition, as illustrated in FIG. 21, the apex 31a of the clip slider main body 31 exists in the clip slider 30, and is engaged with the cut-out portion 27b which is in one location in the slidable case 27 of the above-described FIG. 14.

In a state where the back shaft 26 and the slidable case 27 are engaged with each other as illustrated in FIG. 10 above, a front half portion 27c (FIG. 16) of the slidable case 27 is disposed at a back end inner portion of the back shaft 26, and meanwhile, a back half portion of the slidable case 27 is protruded from a back end opening portion 26b of the back shaft 26. The protruded back half portion of the slidable case 27 is considered a knocking portion 27d, and the entire slidable case 27 slides back and forth with respect to the back shaft 26 by a knocking operation.

When the multi-core writing instrument can perform writing as all of the refills which are contained in the multi-core writing instrument are protruded from the protrusion hole of the front shaft, or when the multi-core writing instrument can perform an operation of sending out the core by further moving the slider back and forth after the refill is protruded from the protrusion hole of the front shaft, the slidable case 27 and the back shaft 26 may be fixed separately, and in addition, may be integrated. A case of a writable state as all of the refills which are contained in the multi-core writing instrument are protruded from the protrusion hole of the front shaft is, for example, a case where all of the refills are ballpoint pen units, or a case where the refills are ballpoint pen units and stylus pen units. In addition, the core is not limited to the sharp core of a sharp unit, and for example, may be the eraser of an eraser unit.

Figure 15:
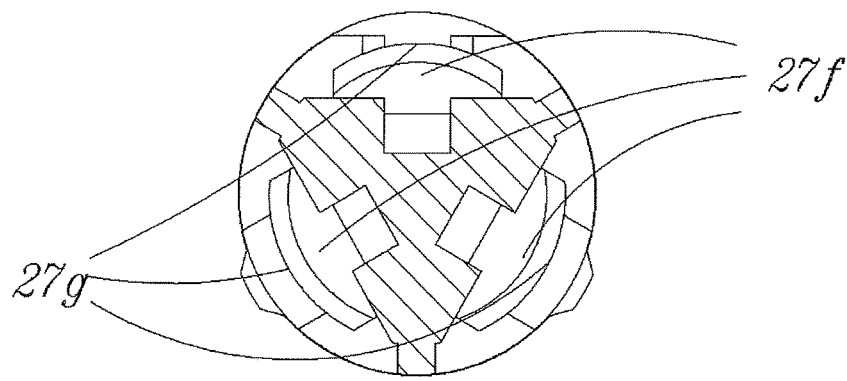
FIG. 15 is a lateral sectional view along line G-G of FIG. 14.
Figure 16:
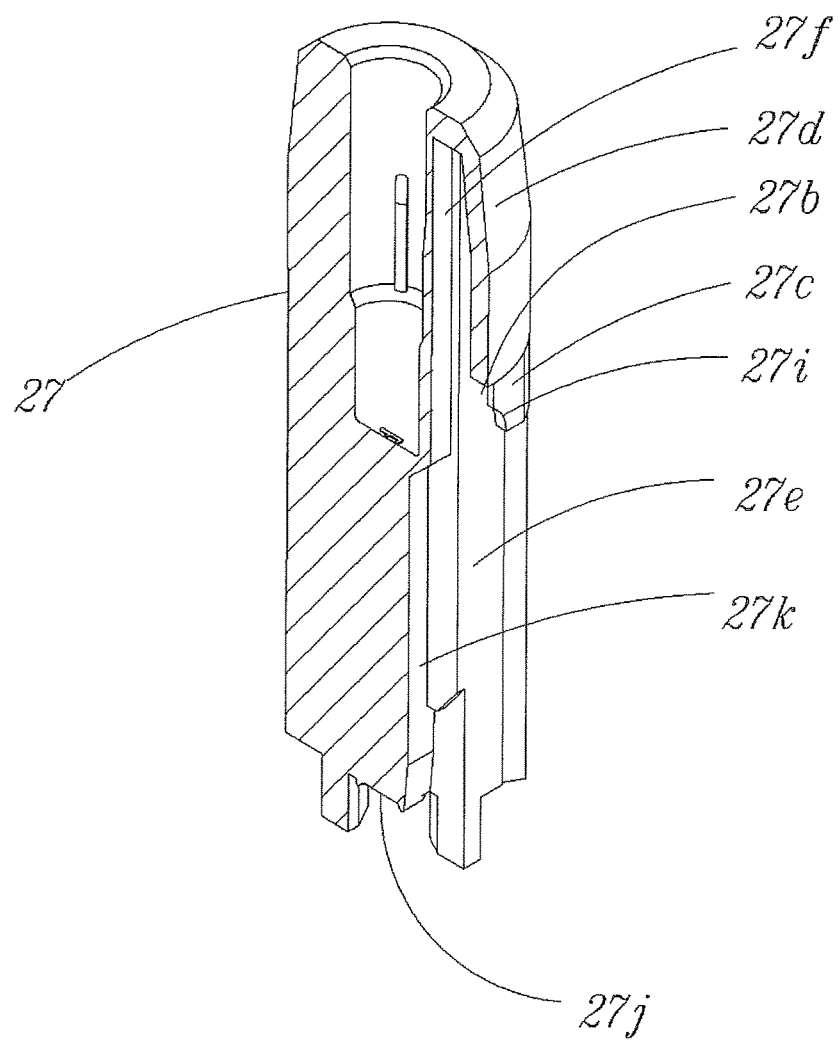
FIG. 16 is a longitudinal sectional perspective view along line H-H of FIG. 14.
Figure 17:
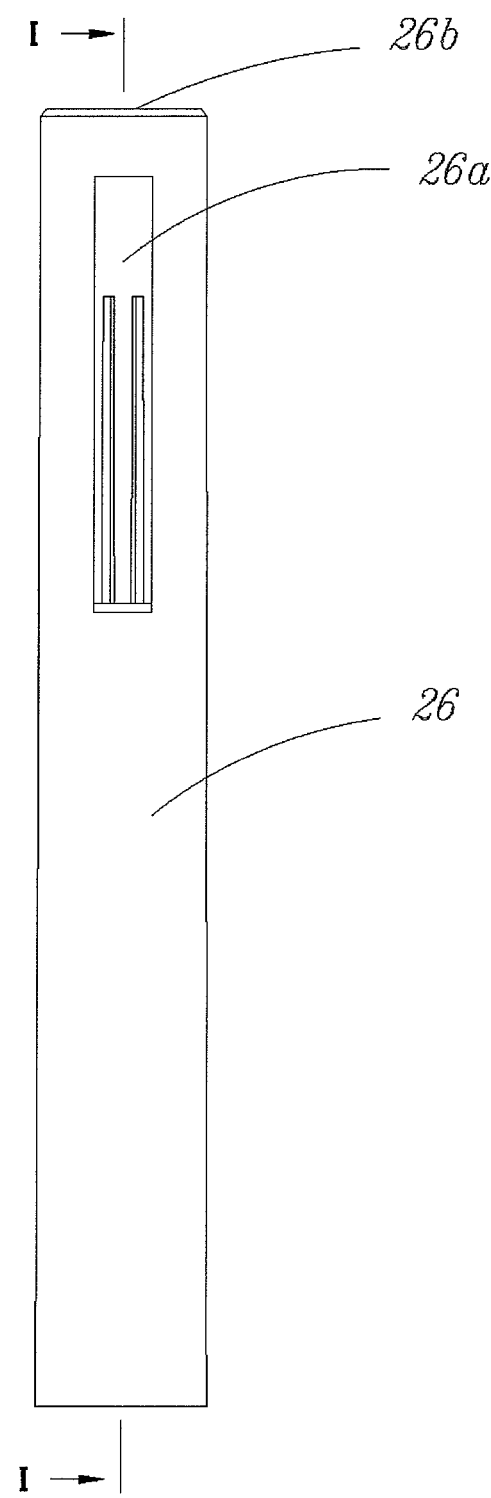
FIG. 17 is a front view of a back shaft 26.

As illustrated in FIGS. 14 to 16, the inside of the slidable case 27 crosses over the entire length, and is divided by a beam-shaped dividing wall 27e to split a radial direction. In addition, the slidable case 27 is made in a shape of a tube with a bottom, but a front side from an intermediate portion does not have a tube portion 27f, and is in an opened state in the radial direction. Specifically, a cut-out portion 27g of which a shape of a cross section is a shape of a fan is formed, and the cut-out portion 27g is in an opened state. In other words, by using the cut-out portion 27g as a slidable surface, the slider 29 or the clip slider 30 slides in the slidable case 27. The pressing portion 29a (FIGS. 10 and 11) of the slider 29 and a clip supporting portion 31b of the clip slider main body 31 are protruded to the outside from the window hole 26a of the back shaft 26, and the slider 29 and the clip slider 30 slide in the window hole 26a of the back shaft 26.

In a state where the pen tip 38 is retracted, the slider 29 is pushed to a back side by a repulsive force of a repulsive member 35, and an arc-shaped abutting portion 29c (FIG. 20) of the slider 29 abuts against a slider abutting portion 27h (FIG. 13) of the slidable case 27. Planes of the slider 29 and the slider abutting portion 27h of the slidable case 27 may come into contact with each other, but in the present Embodiment, arcs thereof are brought into contact with each other. Accordingly, a concentration of stress which is caused by an impulsive force to the slidable case 27 of the slider 29 by the repulsive force of the repulsive member 35 is mitigated, and the possibility of generation of breakage is reduced.

In addition, a similar structure is also employed in the clip slider 30, and an arc-shaped abutting portion 31c (FIGS. 21 and 22) of the clip slider main body 31 abuts against a clip slider abutting portion 27i (FIG. 14) of the slidable case 27. Accordingly, an effect which is equivalent to that of the above-described slider 29 is obtained.

Figure 18:
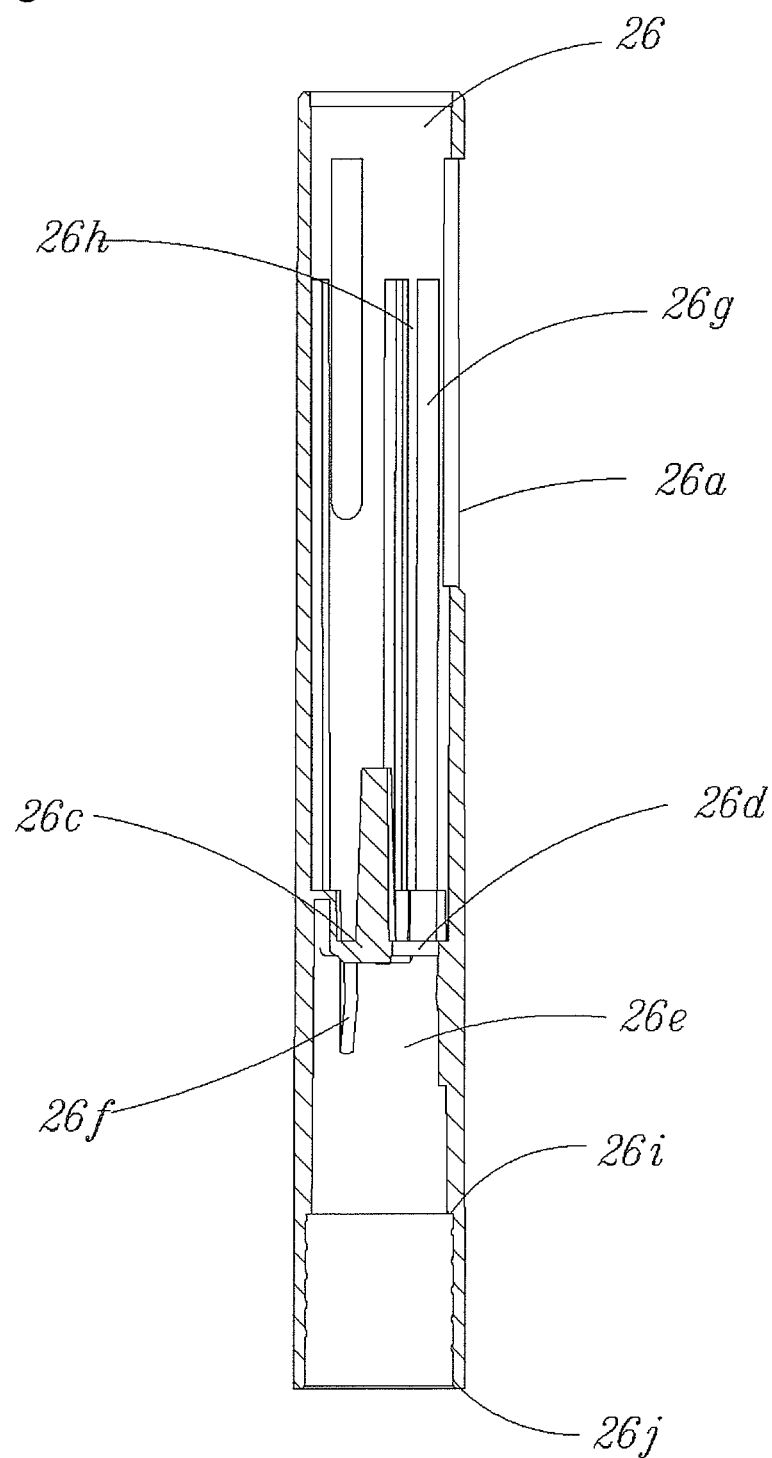
FIG. 18 is a longitudinal sectional view along line I-I of FIG. 17.

In this state, when the user makes the slider 29 or the clip slider 30 move forward, the slider 29 or the clip slider 30 falls in the direction of the shaft center, and an engagement projection 29d (FIG. 19) of the slider 29 or an engagement projection 31d (FIG. 21) of the clip slider main body 31 are engaged with an engagement concave portion 27j which is provided at the center of the beam-shaped dividing wall 27e (FIG. 16) in the slidable case 27. At this moment, the pen tip 38 or the tip member portion 42 are protruded from the protruded hole 25b of the tip end of the front shaft 25, and writing becomes possible. When the pen tip 38 or the tip member portion 42 are protruded, as illustrated in FIG. 18, a refill regulating rib 26f which is provided towards the center of a through hole 26d from an inner circumferential surface 26e in the vicinity of the through hole 26d which is provided in a regulating portion 26c in the back shaft 26, and the protruded refill 28 come into contact with each other. By this contact operation, the pen tip 38 or the tip member portion 42 of the tip end of the refill 28 is forcibly oriented towards the protruded hole 25b of the tip end of the front shaft 25. Accordingly, without making the refill 28 bend in the front shaft 25, the pen tip 38 or the tip member portion 42 is protruded from the protruded hole 25b. For example, when the refill 28 is the sharp unit 41, as the sharp unit 41 itself is bent, it is possible to prevent a malfunction in sending out the embedded sharp core L, or the like, and to send out the core smoothly.

Furthermore, as illustrated in FIG. 18, on an inner surface of the back shaft 26, an inserting groove 26h is formed by one pair of positioning ribs 26g. The beam-shaped dividing wall 27e of the slidable case 27 is fitted into the inserting groove 26h to be freely slidable, and rotation in the radial direction, that is, relative rotation is prevented. Specifically, two positioning ribs 26g are provided at an interval which is substantially the same as the width of the dividing wall 27e on the inner circumferential surface of the back shaft 26 with respect to one dividing wall 27e, and the dividing wall 27e slides back and forth between the two adjacent positioning ribs 26g (inserting groove 26h). In other words, since the number of the inserting grooves 26h in the back shaft 26 becomes double the number of the dividing walls 27e, and the number of the dividing walls 27e is derived from the number of the refills 28, the number of the positioning ribs 26g is also determined by the number of the refills 28. In other words, if the number of the refills 28 is two, the number of the positioning ribs 26g is four, and if the number of the refills 28 is three, the number of positioning ribs 26g is six.

The shaft main body 23 is configured of the front shaft 25, the back shaft 26, and the slidable case 27, and as described above, the slidable case 27 and the back shaft 26 are prevented from being disengaged and disassembled by engagement between the engagement projection 27a and the window hole 26a. In addition, the front shaft 25 and the back shaft 26 are bound together and detachable by screwing. In order to fasten a screw portion end surface 25c (FIG. 10) of the front shaft 25 by making the screw portion end surface 25c abutted, a screw fastening step portion 26i is formed in a circumferential shape inside the back shaft 26. In the present Embodiment, the clip does not cover the front shaft 25, an external appearance back end surface 25d of the front shaft 25 and a back shaft tip end surface 26j come into contact with each other by screwing to the back shaft 26, and screwing is fastened. However, the contact portion does not exist on the external appearance back end surface of the front shaft, the screw fastening step portion and the screw portion end surface of the front shaft come into contact with each other in the back shaft inner portion in the example where the front shaft is covered with the clip, and screwing is fastened. In consideration of space or thickness in the back shaft, the screw fastening step portion may be configured of a plurality of ribs. However, from the viewpoint of the processing of molding and appearance when using a transparent resin, it is desirable that the step portion is provided in a circumferential shape.

In addition, in the present Embodiment, the front shaft 25 and the back shaft 26 are configured by a screwing structure, but may be pressed in as concave and convex portions that are fitted to each other, and may be formed to be integrated with each other. However, in consideration of ease of exchanging and molding the refill, the number of components may be two, and the components may be fixed to be freely detachable.

In the back shaft 26, three window holes 26a which extend in the longitudinal direction are formed. In the present Embodiment, three window holes 26a are formed, but this is because the total number of the ballpoint pen units 37 and the sharp units 41 which are the refills 28 is three, and the number of the window holes 26a to be formed is also changed according to the number of the refills 28. The slidable case 27 to which the back end of the back shaft 26 is attached to be slidable is formed in the back shaft 26. The inside of the slidable case 27 is divided in the radial direction by the number of the refills 28 (division 27k (FIG. 16)), and the division 27k is divided by the beam-shaped dividing wall 27e which radially widens around the shaft center. The slider 29 which is attached to the back end of the refill 28 or the clip slider 30 slides back and forth in the division 27k, and a retracting operation of the pen tip 38 of the ballpoint pen unit 37 or the tip member portion 42 of the sharp unit 41 is performed. The number of the divisions 27k is also three in this example, but the number of the divisions 27k changes according to the number of the refills.

In the window hole 26a of the back shaft 26, the slider 29 which is made of an opaque material or the clip slider main body 31 are disposed to be slidable. On both sides of the slider 29 in the longitudinal direction, falling-out prevention projections 29e (FIGS. 19 and 20) are formed, and prevent the slider 29 from being disengaged from the window hole 26a of the back shaft 26. Similarly, in the clip slider 30, falling-out prevention projections 31e (FIGS. 21 and 22) are also formed in the clip slider main body 31, and prevent the clip slider 30 from being disengaged from the window hole 26a. Furthermore, in the present Embodiment, the window hole 26a in which the clip slider 30 is disposed is formed in the longitudinal direction to be longer than the other window hole 26a. In the present Embodiment, this is because the length of the clip supporting portion 31b of the clip slider main body 31 in the longitudinal direction is formed to be longer than that of the pressing portion 29a of the slider 29.

On rear surfaces of the slider 29 or the clip slider 30 (clip slider main body 31), as illustrated in FIGS. 19 and 21, one engagement projection 29d and 31d, and two releasing projections 29f and 29g, and 31f and 31g, are formed at certain intervals. The engagement projections 29d and 31d are locked to the engagement concave portion 27j (FIG. 16) which is provided in a center portion of the beam-shaped dividing wall 27e that divides the slidable case 27, and a state where the pen tip 38 of the ballpoint pen unit 37 or the tip member portion 42 of the sharp unit 41 is protruded is maintained. When the other slider 29 which is positioned at the back portion in a state where the pen tip 38 of the ballpoint pen unit 37 or the tip member portion 42 of the sharp unit 41 is protruded is moved forward, the releasing projection 29g of the slider 29 which is moved forward comes into contact with the releasing projection 29f of the locked slider 29 or the releasing projection 31f of the clip slider main body 31, the locked state is released as the locked slider 29 or the clip slider main body 31 moves outward in the radial direction, the slider 29 or the clip slider 30 moves backward by a repulsive force of the repulsive member 35 at this moment, and the pen tip 38 of the ballpoint pen unit 37 or the tip member portion 42 of the sharp unit 41 which is in a protruded state, is in a retracted state.

Figure 45:
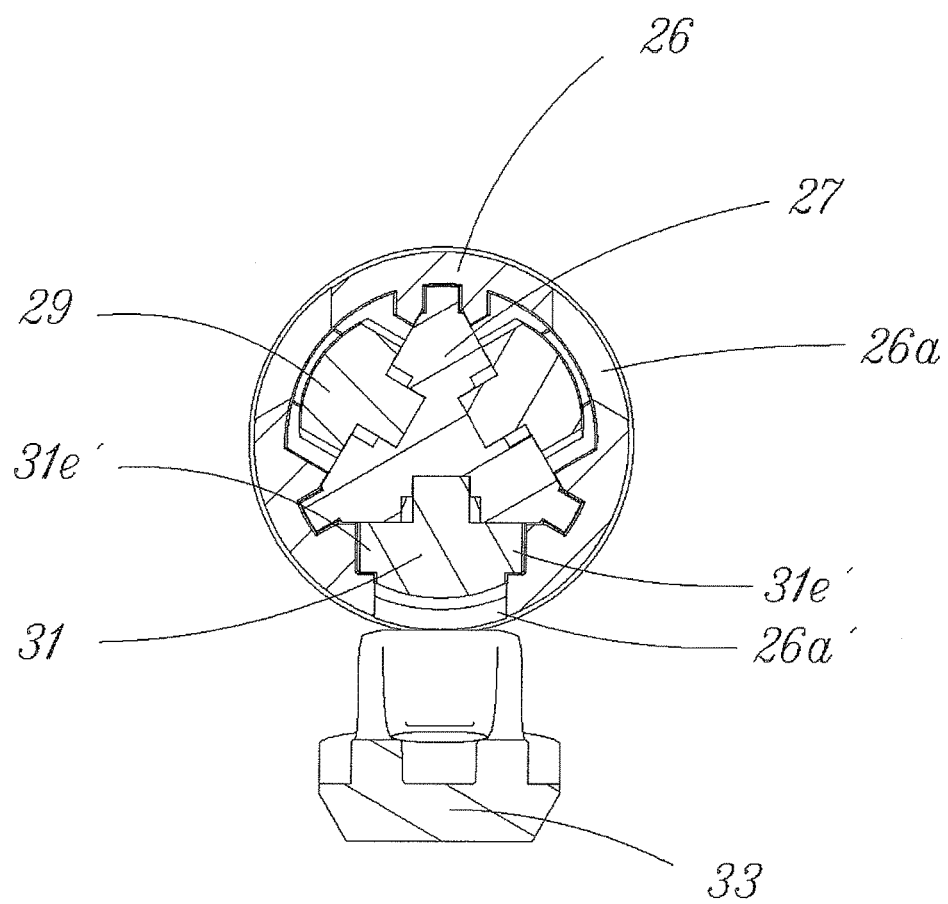
FIG. 45 is a lateral sectional view along line E-E of FIG. 9 according to a modification example of Embodiment 3 of the present invention.
Figure 46:
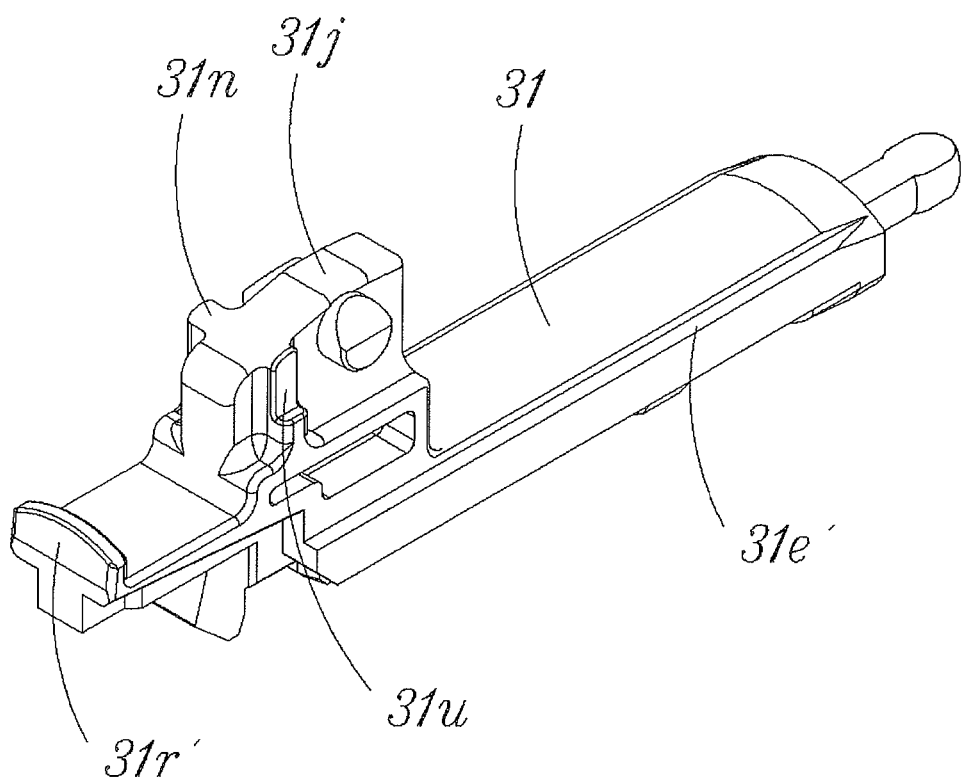
FIG. 46 is a perspective view of a clip slider main body 31 according to the modification example of Embodiment 3 of the present invention.

In Embodiment 3, a shape of the surface which opposes the falling-out prevention projection 31e of the clip slider main body 31 and the window hole 26a of the back shaft 26 is a curved surface (FIG. 24), but may be formed of a plane which is substantially perpendicular with respect to the protruding direction of the clip slider main body 31 (FIGS. 45 and 46). As illustrated in FIGS. 45 and 46, when a shape of a surface which opposes a falling-out prevention projection 31e' and a window hole 26a' is a plane, it is possible to further ensure prevention of falling out of the back shaft 26 of the clip slider main body 31 when a force in a lateral direction is applied or a twisting force is applied to the clip slider main body 31.

Furthermore, in the clip slider main body 31 illustrated in FIG. 46, in a projected plate 31n which will be described later and which is provided to be protruded to the left and right side surfaces of a supporting plate 31j, a concave portion 31u is formed by cutting out one clip main body 33 side. This is because a gate is provided in the concave portion 31u when injection molding is performed, and the concave portion 31u may not necessarily be formed.

In addition, as illustrated in FIG. 19, a projection portion 36 which has a shape of a plate in the longitudinal direction is formed at the front end of the slider 29 or the clip slider 30 (clip slider main body 31). At a tip end of the projection portion 36, a substantial disk-shaped swelling portion 36a is formed. As the projection portion 36 or the swelling portion 36a has a shape of a plate and a shape of a disk, when the refill 28 which will be described later is connected, a flow passage of air is formed. In other words, when the refill 28 is the ballpoint pen unit 37 as in this example, air infiltration into the refill (ballpoint pen) according to consumption of ink 40 is reliably ensured.

Then, a back side portion of an ink storage tube 39 of the ballpoint pen unit 37 is connected to the projection portion 36 (swelling portion 36a). Here, the slider 29 is formed of an opaque material which is colored with the same color as the color of the ink which is used in the ballpoint pen unit 37, but may be formed of a transparent or a colored translucent material. A feeling of depth of the slider 29 is generated, and further, external beauty is improved. In addition, similarly, the clip slider 30 is also inserted into the back side of the sharp unit 41, is colored with a color which is different from the color of the slider 29 that is connected to the ballpoint pen unit 37, and is distinguished. However, the clip slider 30 may be configured of a similar color as that of the slider which is connected to the ballpoint pen unit.

In the present Embodiment, the ink storage tube 39 of the ballpoint pen unit 37 is configured of a transparent or a colored translucent material. However, a connection portion at least with the slider 29 of the ink storage tube 39 may be configured of a transparent or a colored translucent material. When the refill 28 is exchanged, it is possible to easily ensure a state where the refill 28 and the slider 29 (swelling portion 36a) are connected to each other.

Figure 28:
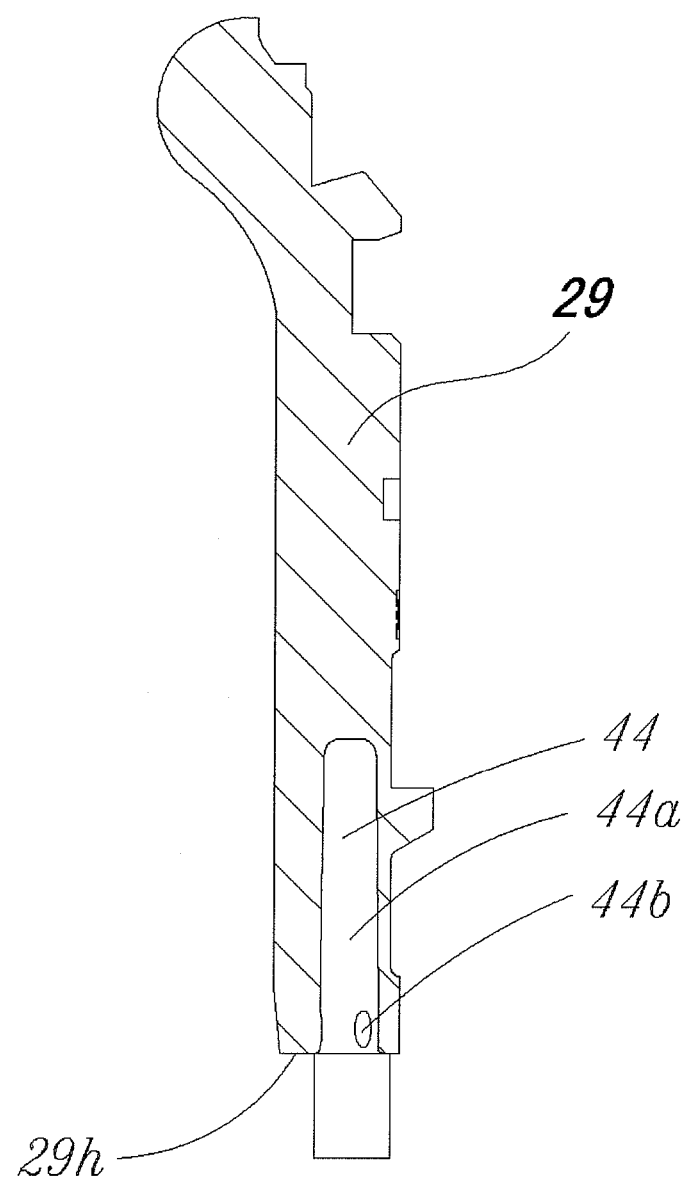
FIG. 28 is a longitudinal sectional view along line J-J of FIG. 27.
Figure 29:
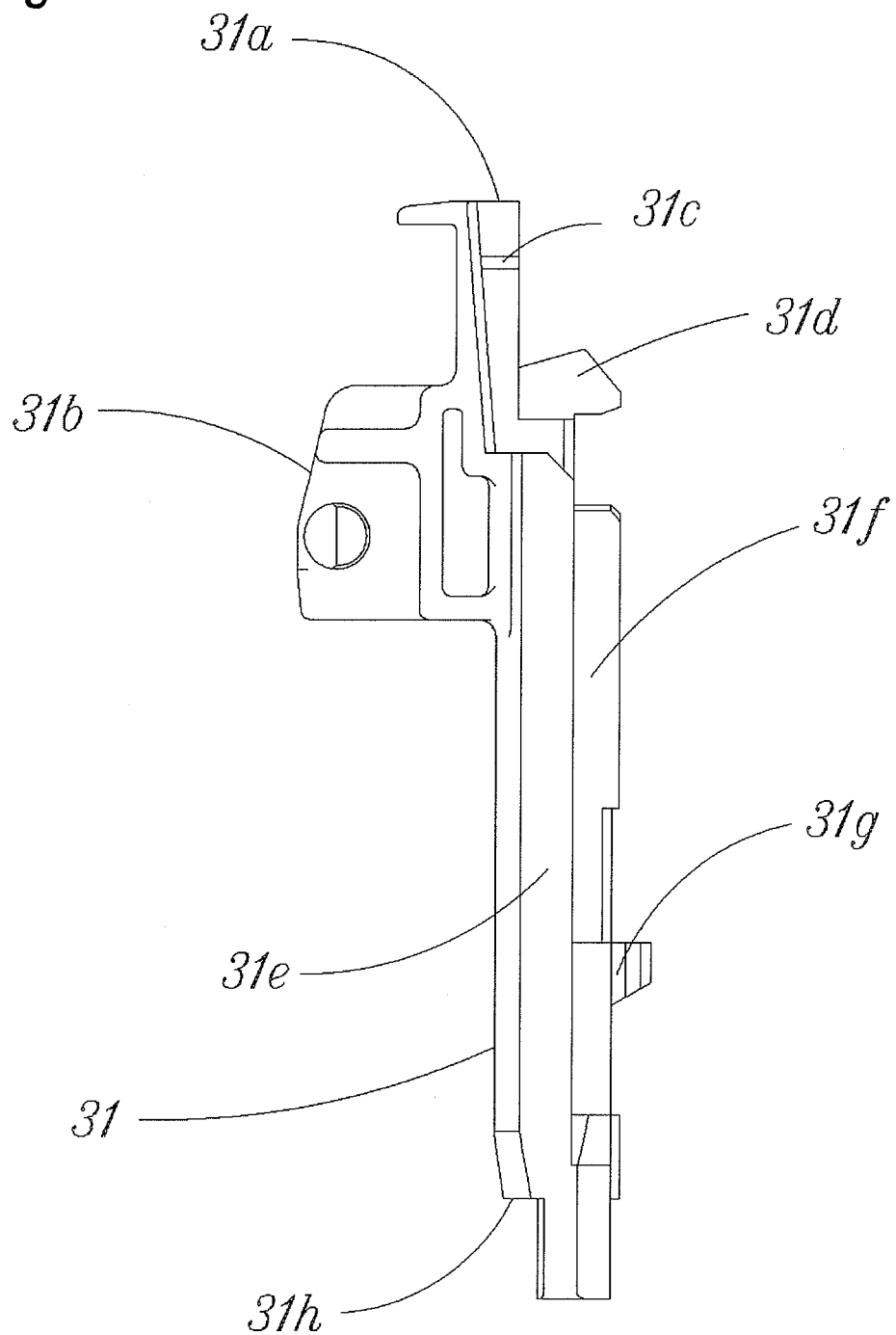
FIG. 29 is a right side view of the clip slider 30 in the embodiment where the detachable member 45 is configured.
Figure 30:
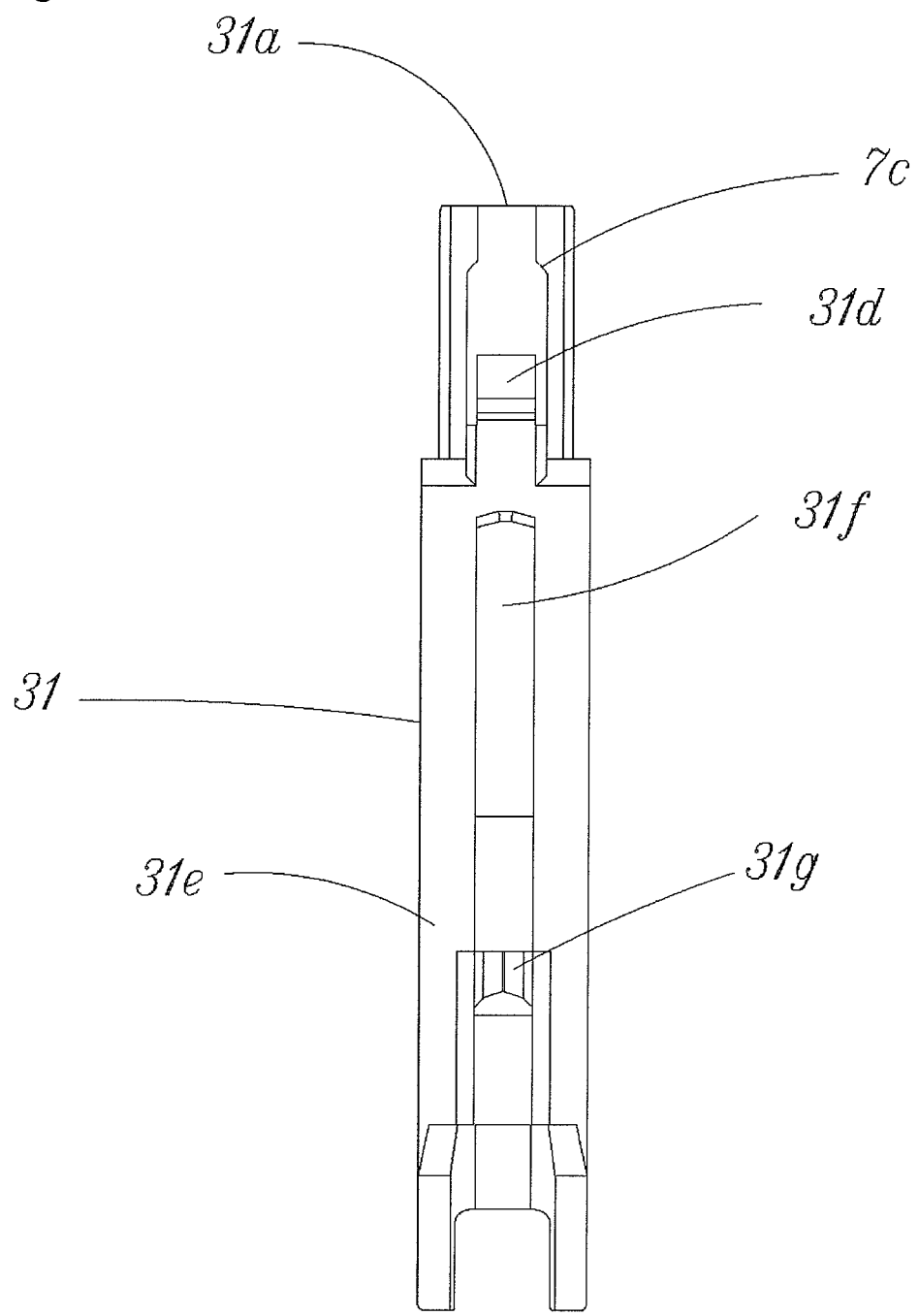
FIG. 30 is a rear view of the clip slider 30 in the embodiment where the detachable member 45 is configured.
Figure 31:
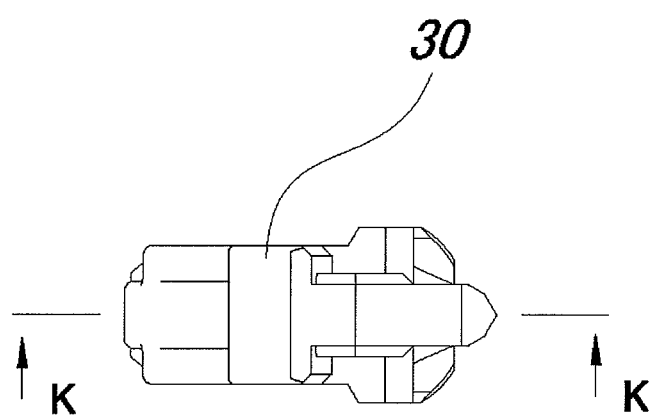
FIG. 31 is a top view of the clip slider 30 in the embodiment where the detachable member 45 is configured.
Figure 32:
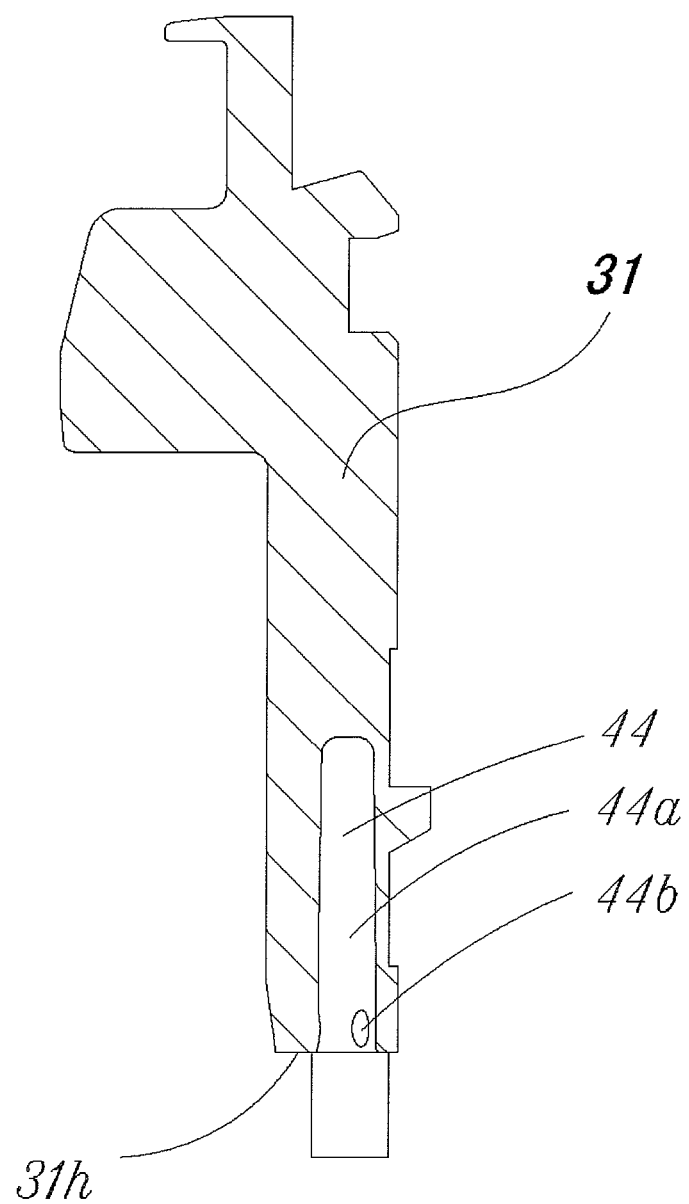
FIG. 32 is a longitudinal sectional view along line K-K of FIG. 31.
Figure 33:
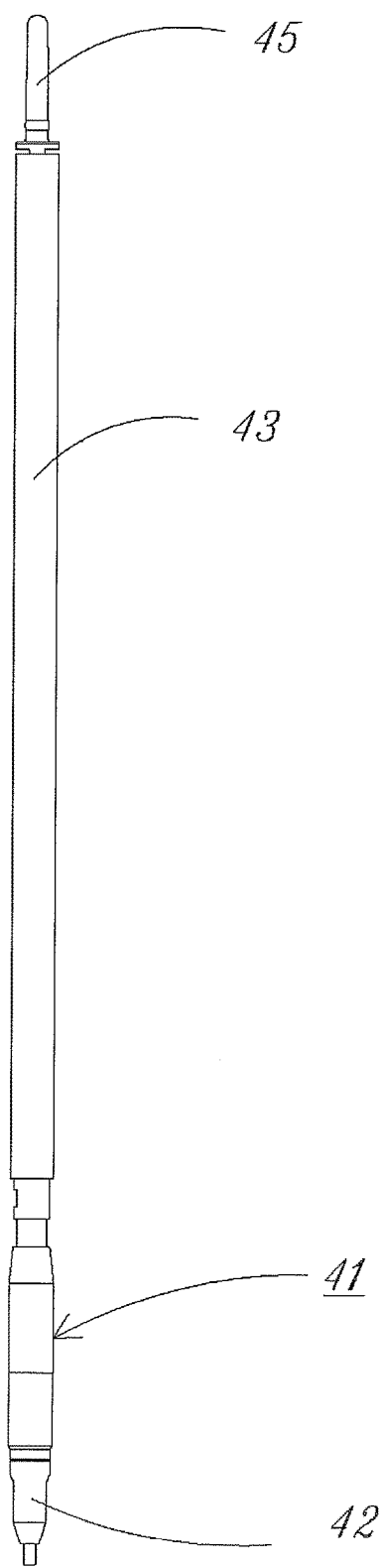
FIG. 33 is a view of an external appearance of a sharp unit 41 in a state of being fitted to the detachable member 45.

Here, a structure in which the slider 29 or the clip slider 30 and the refill 28 are linked to each other is not limited to the above-described configuration. For example, as illustrated in FIGS. 28 and 32, a refill fitting projection 44b may be formed on an inner circumferential surface 44a of the hole portion 44 while a hole portion 44 which is recessed in the longitudinal direction at the front end of the slider 29 or the clip slider 30 is formed, and a detachable member 45 (FIG. 33) which is provided at the back end of the refill 28 may be fixed to the hole portion 44 to be detachable (FIGS. 25 to 33). As the detachable member 45 is adhered to the back end of the refill 28 (sharp unit 41) illustrated in FIG. 33 in a state where the flow passage of air is ensured, and adhesive strength thereof is strengthened by fitting strength between the slider 29 or the clip slider main body 31 and the detachable member 45, the user can simply detach and exchange the preferable refill 28. Furthermore, when the refill 28 is the sharp unit 41, adhesion between the refill 28 and the detachable member 45 may not be in a state where the flow passage of air is ensured. However, when the refill 28 is the ballpoint pen unit 37, it is desirable that a state where the flow passage of air is ensured is achieved. Here, the slider 29 or the clip slider 30 is formed of an opaque material, but may be formed of a transparent or a colored translucent material. As being formed of a transparent material, the detachable member 45 which is attached to the back end of the refill 28 can be visually confirmed through the slider 29 or the clip slider 30, and the user can identify the refill. Furthermore, a depth feeling of the slider 29 or the clip slider 30 is generated, and further, beauty of appearance is improved.

Furthermore, as illustrated in FIG. 28, in a front end portion of the slider 29, a flange portion 29h against which a back end portion of the repulsive member 35 which will be described later abuts is formed. Similarly, even in a front end portion of the clip slider main body 31, a flange portion 31h against which the back end portion of the repulsive member 35 abuts is formed.

Figure 12:
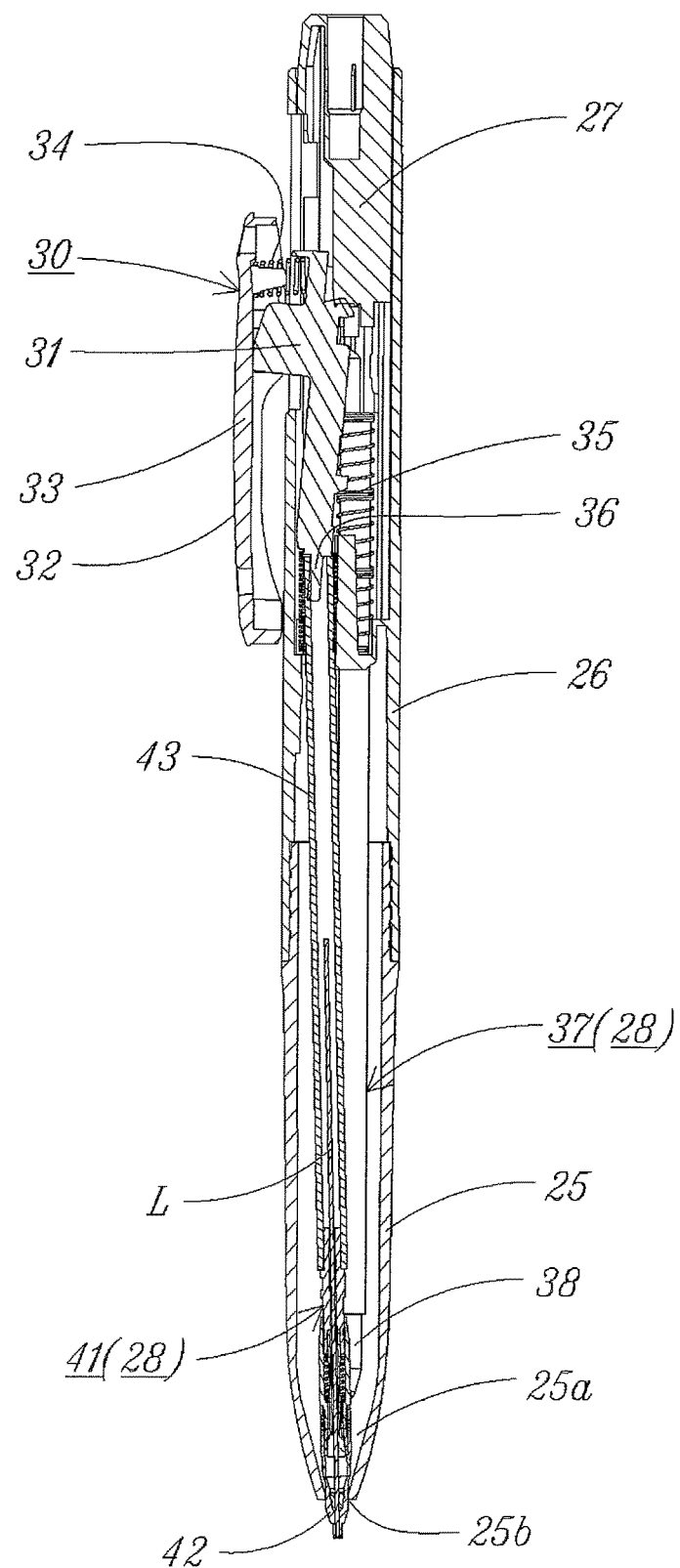
FIG. 12 is a longitudinal sectional view along line F-F of FIG. 11.

A reference numeral 35 of FIGS. 10 and 12 indicates a repulsive member, such as a coil spring, which biases the refill 28 and the slider 29 or the clip slider 30 that is connected to the refill 28 backward. Furthermore, as described above, two refills 28 which are fitted to the slider 29 in the present Embodiment are the ballpoint pen units 37 as described above, and one refill 28 which is fitted to the clip slider 30 is the sharp unit 41. The ink storage tube 39 of the ballpoint pen unit 37 and a core tank 43 of the sharp unit 41 are connected to the slider 29 and the swelling portion 36a of the clip slider 30. Specifically, the ballpoint pen unit 37 which accommodates black and red ink and the sharp unit 41 are connected to each other.

The regulating portion 26c is formed in an intermediate portion of the back shaft 26 illustrated in FIG. 18, three through holes 26d in which the refill 28 is loosely inserted are formed in the regulating portion 26c, and the refill 28 is biased backward as one end of the repulsive member 35 is locked to the regulating portion 26c.

Here, the clip attaching structure according to the present Embodiment will be described with reference to FIGS. 34 and 35. The clip slider 30 is made of three components, including the clip slider main body 31 which constitutes the clip supporting portion 31b protruded from the outer circumferential portion of the clip slider main body 31 (main body 24), the clip main body 33 which is engaged with the clip supporting portion 31b, and a coil spring 34 which biases the back portion of the clip main body 33 to make the clip main body 33 separated from the outer circumferential surface of the clip slider main body 31, and is a pressing portion for moving the refill 28 in which a back side outer surface of the clip main body 33 is connected to the front end of the clip slider 30 forward.

In the clip slider main body 31, the clip supporting portion 31b is provided to be protruded to the back side. The clip supporting portion 31b is configured of a supporting stand 31i and a supporting plate 31j illustrated in FIGS. 21 to 24. On left and right side surfaces of the supporting stand 31i, a thinned groove 31k is formed. Since the thinned groove 31k is thick across the supporting plate 31j from the clip slider main body 31, a molding defect, such as a sink, is prevented. Furthermore, in the present Embodiment, the clip slider main body 31 is configured of a material which is made of a colored opaque resin, and is molded by injection molding or the like.

On the left and right side surfaces of the supporting plate 31j, a columnar fulcrum shaft 31m is provided to be protruded in a direction which is perpendicular to the longitudinal direction of the clip slider main body 31 (main body 24). On the back side of the fulcrum shaft 31m, a projected plate 31n is provided to be protruded from the left and right side surfaces of the supporting plate 31j. The projected plate 31n performs a role of preventing the supporting plate 31j from falling down in the lateral direction.

Figure 24:
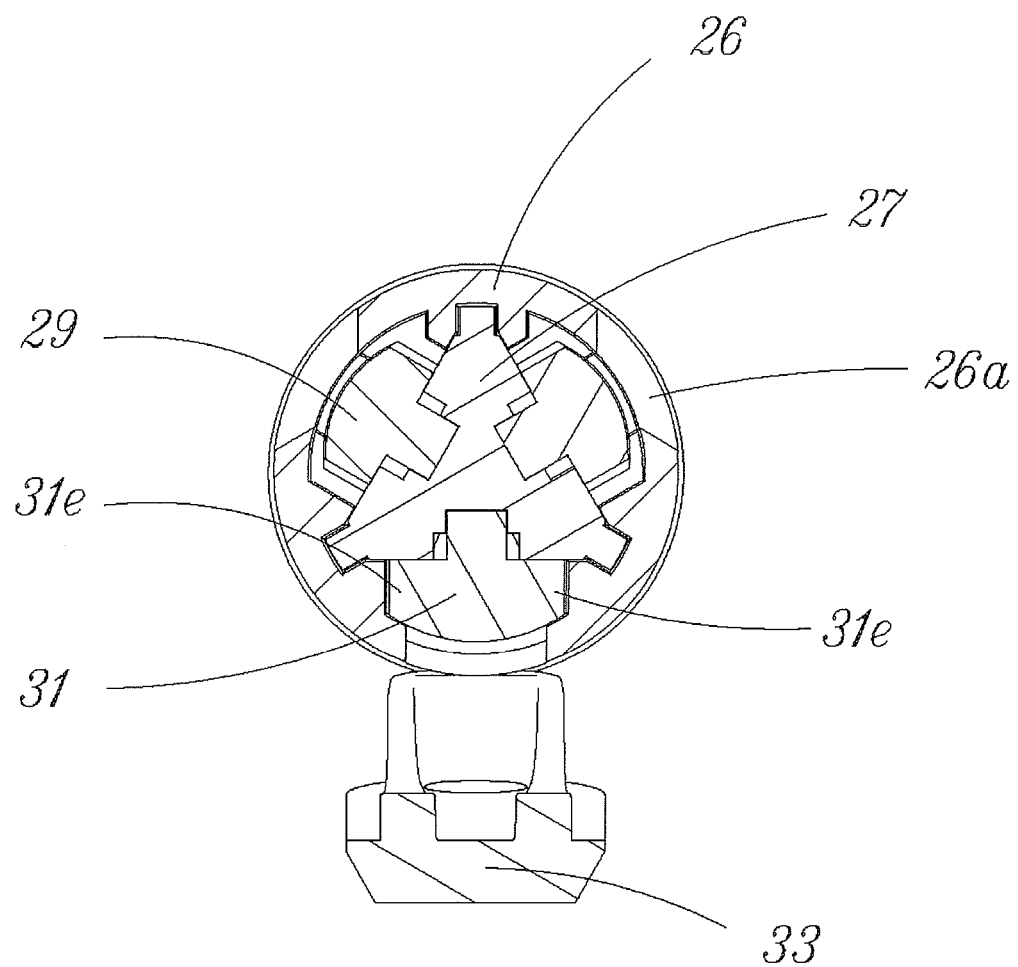
FIG. 24 is a lateral sectional view along line E-E of FIG. 9.
Figure 25:
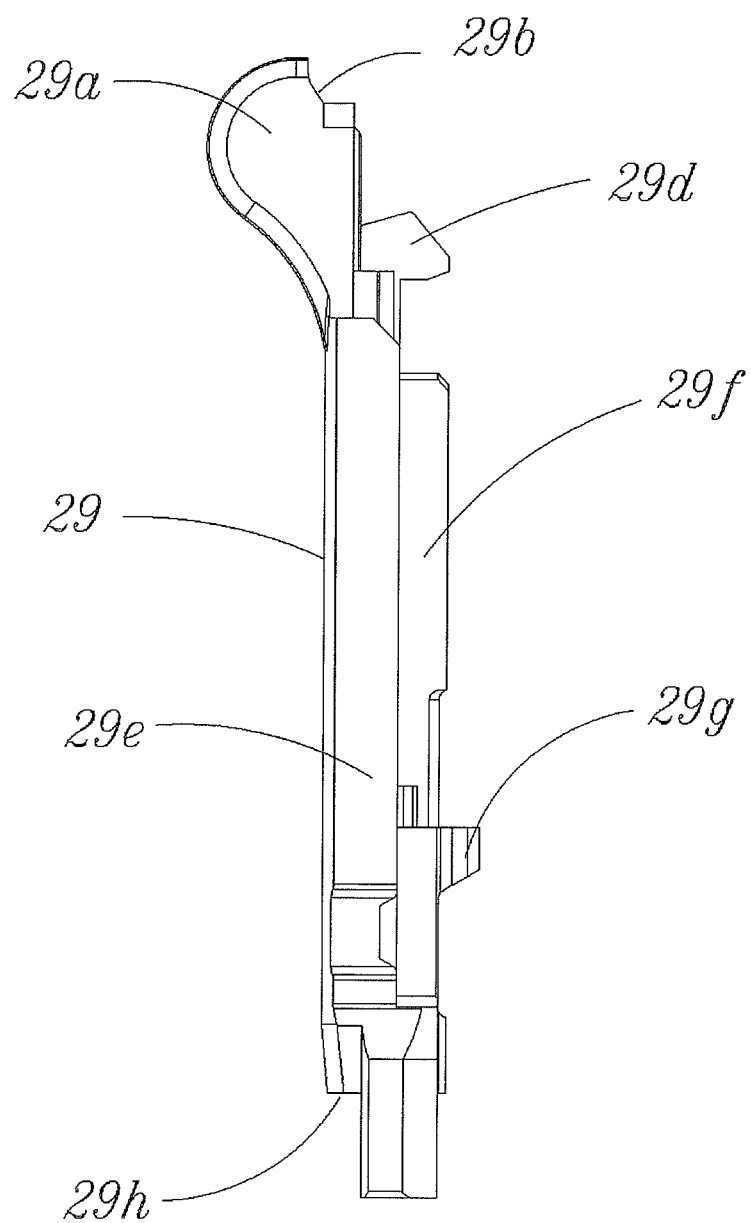
FIG. 25 is a right side view of the slider 29 in an embodiment where a detachable member 45 is configured.
Figure 26:
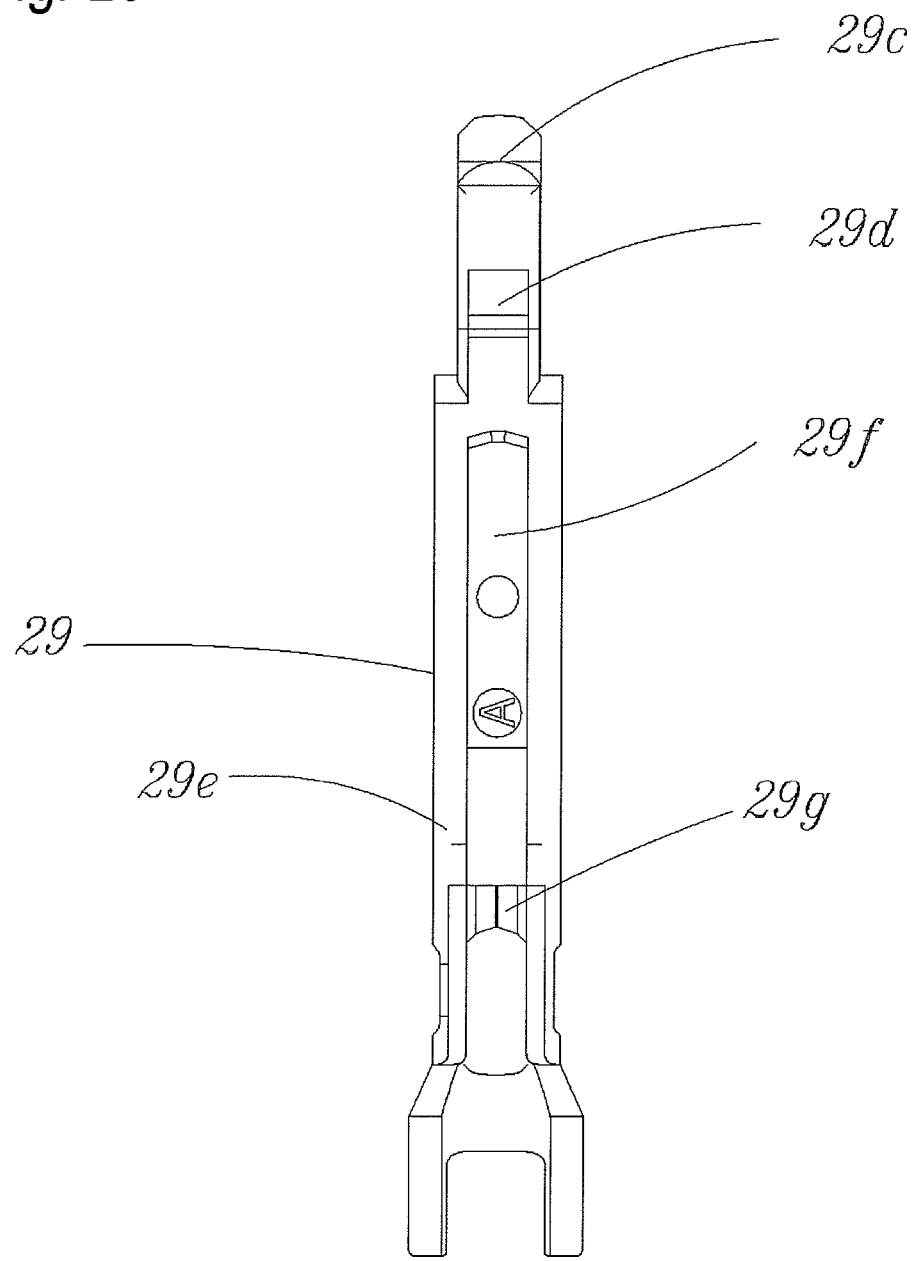
FIG. 26 is a rear view of the slider 29 in the embodiment where the detachable member 45 is configured.
Figure 27:
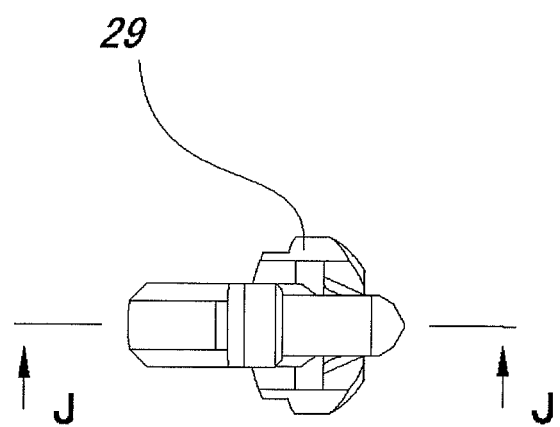
FIG. 27 is a top view of the slider 29 in the embodiment where the detachable member 45 is configured.
Figure 40:
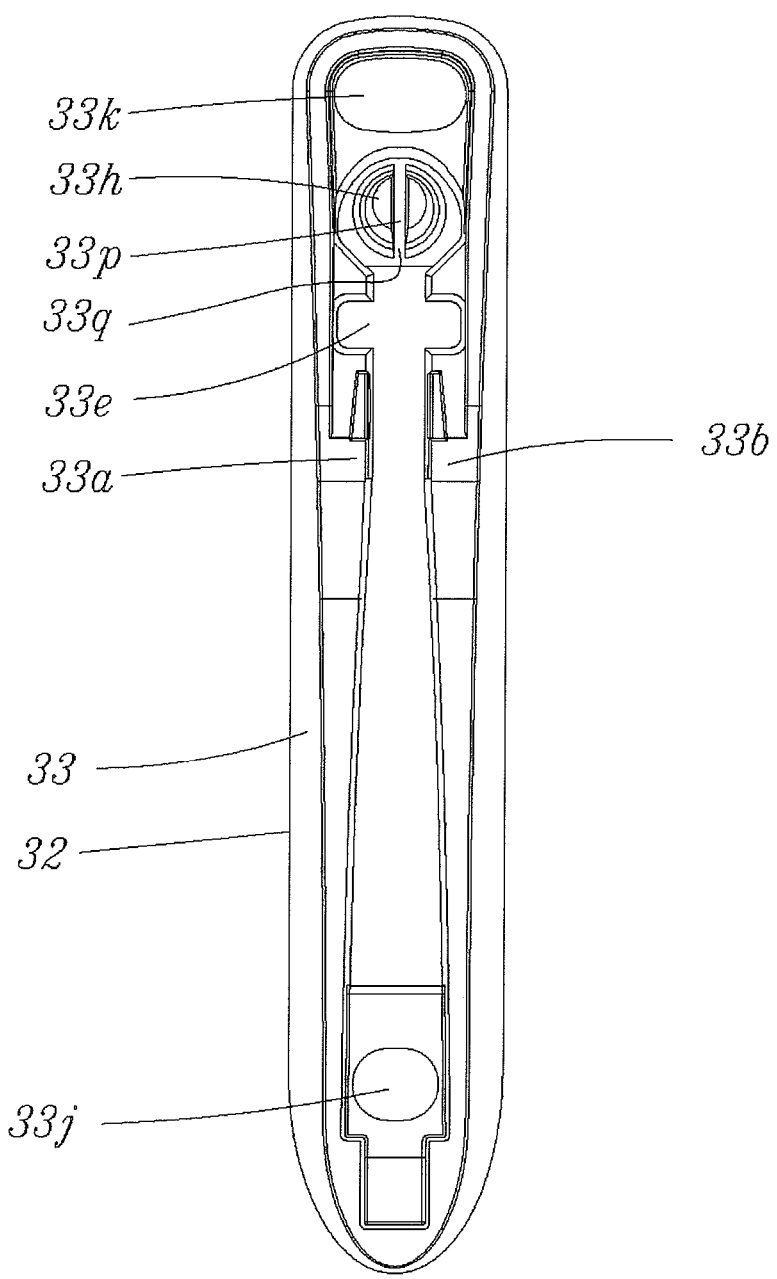
FIG. 40 is a rear view of the clip main body 33.
Figure 41:
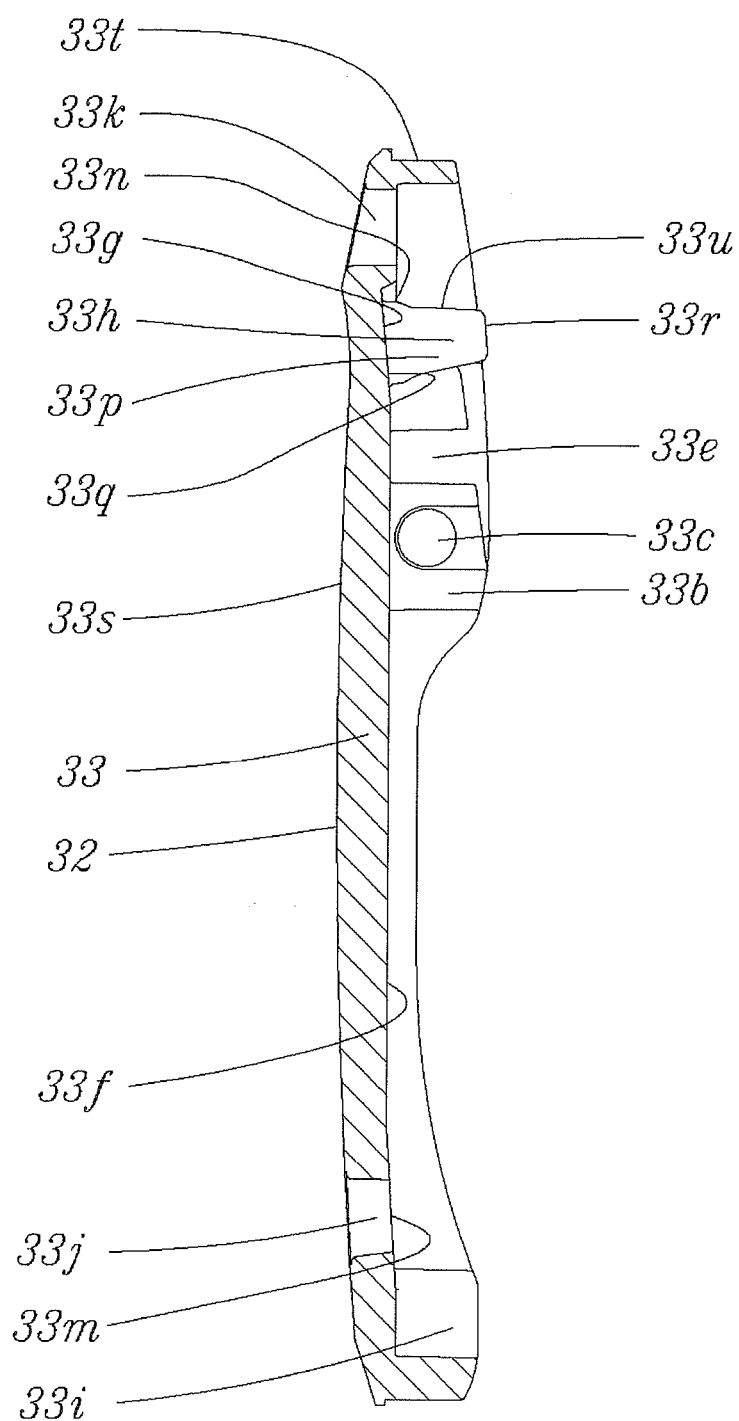
FIG. 41 is a longitudinal sectional view along line L-L of FIG. 39.

Meanwhile, as illustrated in FIG. 24, a lateral cross section of the clip main body 33 is formed in a substantial U shape, and a right side plate portion 33a and a left side plate portion 33b are provided to face the left and right side surfaces of the clip supporting portion 31b (FIG. 40). A fulcrum hole 33c (FIG. 38) is provided to be open in the right side plate portion 33a and the left side plate portion 33b, and a rotating fulcrum 33d with which the fulcrum shaft 31m (FIG. 34) is engaged and which supports the clip main body 33 to be freely rotatable is configured. Furthermore, in the vicinity of the end portion of the fulcrum shaft 31m, a tapered surface portion 31s (FIGS. 21 and 23) which is reduced towards a direction of being separated from the main body 24 is formed. When the fulcrum hole 33c of the clip main body 33 is assembled to the fulcrum shaft 31m, assembly work is easily performed.

In addition, on a back side of the fulcrum hole 33c, a groove portion 33e (FIG. 40) is formed so as to not interfere with the projected plate 31n (FIG. 21) which is provided to be protruded from the left and right side surfaces of the supporting plate 31j.

Furthermore, a front side inclined surface 31p (FIG. 21) for being abutted against an inner bottom surface 33f (FIG. 35) of the clip main body 33 is formed on a front side top surface of the supporting plate 31j. The front side inclined surface 31p performs a role of regulating rotation to the shaft main body 23 rather than the rotating fulcrum 33d of the clip main body 33.

Figure 35:
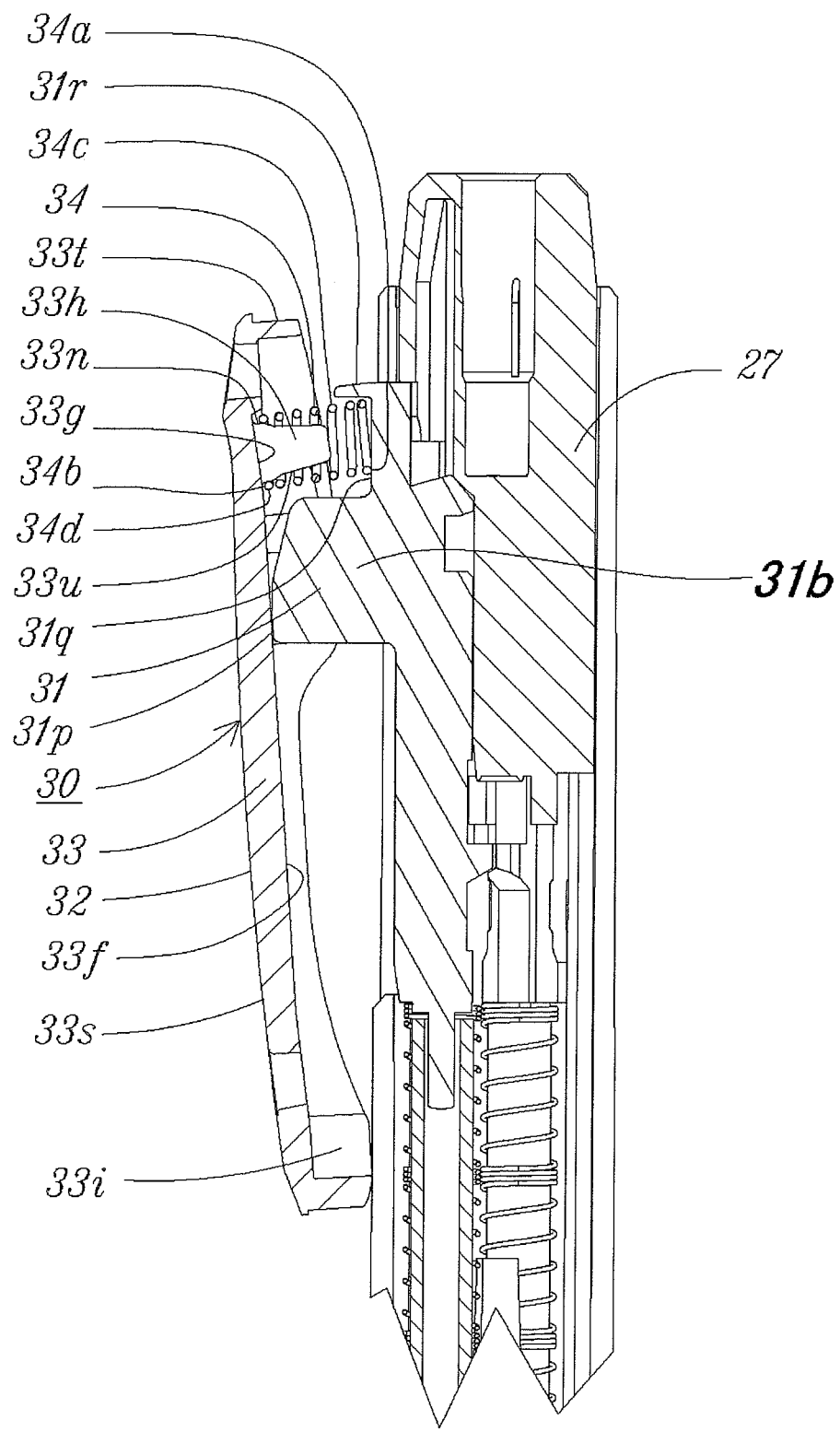
FIG. 35 is a partially enlarged view of FIG. 10.

As illustrated in FIG. 35, in the outer circumferential portion on the back side rather than the clip supporting portion 31b of the clip slider main body 31, a plane portion 31q is provided to face the inner bottom surface 33f of the clip main body 33. One end portion 34a of the coil spring 34 abuts against the plane portion 31q.

In addition, in a back side portion of the inner bottom surface 33f of the clip main body 33, a back side inclined inner bottom surface 33g which is inclined on the outer circumferential surface side is formed, and a tube-shaped convex portion 33h which is protruded towards the plane portion 31q that is perpendicular to and faces the back side inclined inner bottom surface 33g is provided. In addition, the other end portion 34b of the coil spring 34 is inserted to cover the convex portion 33h from the outside. In other words, the convex portion 33h is inserted into the inside of the other end portion 34b of the coil spring 34. The one end portion 34a which abuts against the plane portion 31q and the other end portion 34b which abuts against the back side inclined inner bottom surface 33g constitute a repulsive portion 34c. In other words, by the bias force of the coil spring 34, the back side portion (one end portion of the clip main body 33) is repulsed more than the rotating fulcrum 33d of the clip main body 33 to be separated from the outer circumferential surface of the shaft main body 23, and the front side portion (the other end portion of the clip main body 33) is repulsed more than the rotating fulcrum 33d of the clip main body 33 to abut against the outer circumferential surface of the shaft main body 23 via the rotating fulcrum 33d. More specifically, a ball portion 33i which is formed in the front side portion of the clip main body 33 is repulsed to abut against the outer circumferential surface of the shaft main body 23.

In this configuration, by pressing the back side portion more than the rotating fulcrum 33d of the clip main body 33 towards the shaft line from the outer diameter direction of the shaft main body 23 against the bias force of the coil spring 34, the front side portion rather than the rotating fulcrum 33d of the clip main body 33 is used as a clip 32 which can perform the opening and closing operation and rotate so that the front side portion is separated from the outer circumferential surface of the shaft main body 23 via the rotating fulcrum 33d.

In the back end portion of the plane portion 31q of the clip slider main body 31, a projected wall 31r is provided to be protruded. The projected wall 31r is formed as a blindfold from the back side of the coil spring 34, and the projected wall 31r may not necessarily be formed. As described in this Embodiment, when the projected wall 31r is formed, a void between the clip main body 33 on the back side more than the coil spring 34 and the clip slider main body 31 is buried, and appearance from the back side is further improved. Furthermore, according to the present Embodiment, in a state where the ball portion 33i of the clip 32 abuts against the outer circumferential surface of the shaft main body 23, or in any case where the clip 32 expands and is opened or where the opening and closing operation of the clip 32 is performed, the projected wall 31r is formed at a position where the projected wall 31r does not abut against the coil spring 34.

According to Embodiment 3, a shape of the projected wall 31r when viewed from the back side of the clip slider main body 31 is a substantial rectangular shape, but as illustrated in FIG. 46, an end surface on the clip slider main body 31 side may have a shape of a substantial arc (projected wall 31r'). In addition, it is also possible to make the height of the projected wall an arbitrary height, and the height of the projected wall may be higher or lower than the height of the projected wall 31r illustrated in Embodiment 3.

Figure 34:
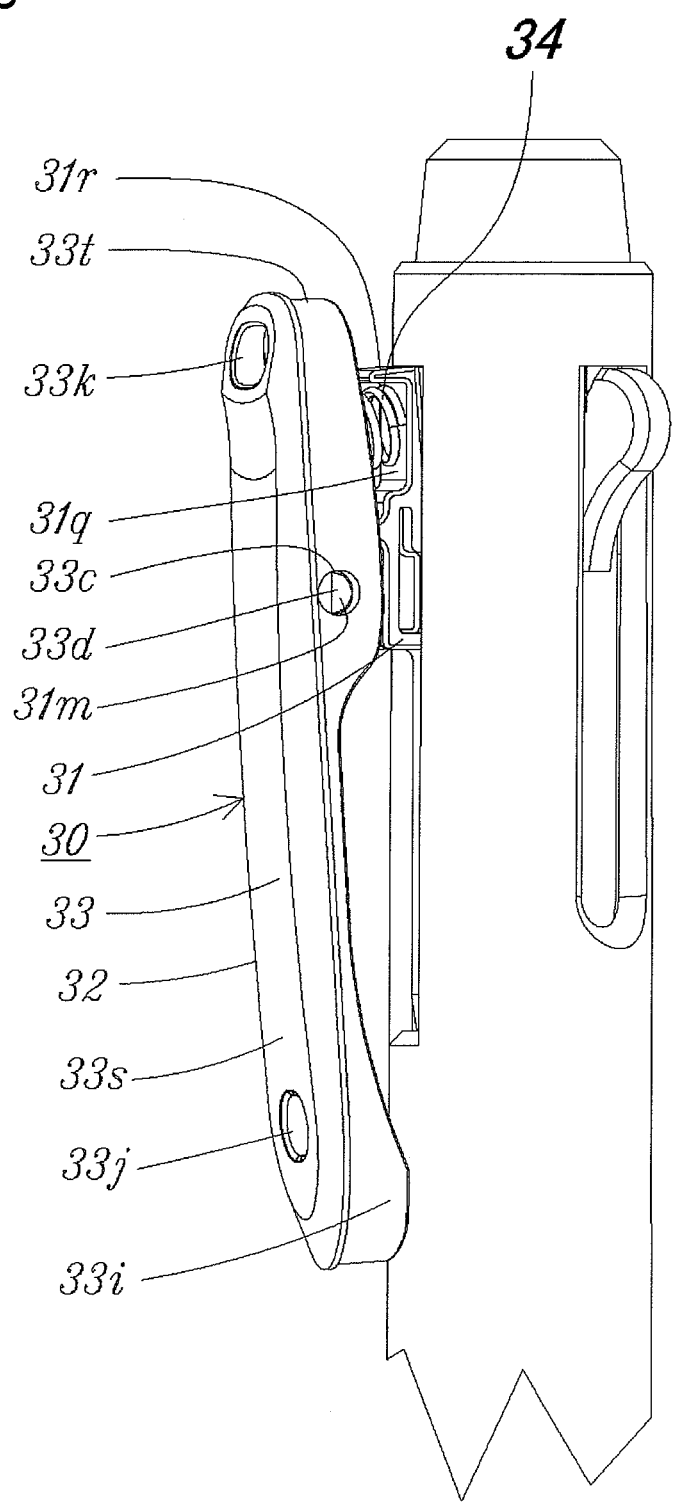
FIG. 34 is a partially enlarged perspective view of FIG. 9.

As illustrated in FIG. 34, on the front side and the back side of the clip main body 33, long elliptical through holes are respectively formed in a direction (lateral direction) which is perpendicular to the longitudinal direction of the clip main body 33 (front side through hole 33j and back side through hole 33k). The front side through hole 33j is formed to be perpendicular to a front side inclined inner bottom surface 33m which is formed on the front side of the inner bottom surface 33f of the clip main body 33, and can mount a decoration by engagement or pressing. The back side through hole 33k is formed to be greater than front side through hole 33j being perpendicular to the inner bottom surface 33f of the clip main body 33. The back side through hole 33k can also mount a decoration by engagement or pressing, but a decoration can be attached generally by a string or a chain.

Furthermore, according to the present Embodiment, the back side through hole 33k is formed together with the front side through hole 33j in the clip main body 33. However, only one of the through holes may be provided, or both the front side through hole 33j and the back side through hole 33k may not be provided, and the shape of the external appearance of the clip main body 33 can be an arbitrary shape. For example, when the clip main body 33 is formed by molding, it is possible to switch a mold of a top surface portion 33s of the clip main body 33, and to form various clips that have the same clip attaching structure by changing only the shape of the top surface portion 33s.

As illustrated in FIG. 35, in the present Embodiment, in the convex portion 33h which is formed in the clip main body 33, on the outer circumferential surface of the base portion which is close to the back side inclined inner bottom surface 33g, a large-diameter portion 33n of which the diameter is slightly greater than the inner circumferential diameter of the coil spring 34 is provided. The large-diameter portion 33n has an effect of preventing the coil spring 34 from being disengaged and lost during the assembly work as a coiled seat portion 34d of the coil spring is pressure-welded, and the coil spring 34 is inserted into the convex portion 33h from the outside, substantially integrally held, and engaged with the clip supporting portion 31b when the clip main body 33 is assembled to the clip supporting portion 31b of the clip slider main body 31.

In the present Embodiment, the length of the large-diameter portion 33n of the convex portion 33h in the protruding direction is substantially the same dimension as a line diameter of the coil spring 34. In addition, a tip end side more than the large-diameter portion 33n in the protruding direction is a small-diameter portion 33u of which the outer diameter is smaller than that of the large-diameter portion 33n. By making the small-diameter portion 33u separated from the inner circumferential surface of the coil spring 34, only the coiled seat portion 34d which is provided in the end portion of the coil spring 34 is pressure-welded. In this configuration, since it is possible not only to prevent a positional shift of the coiled seat portion 34d of the coil spring 34 during the clip opening and closing operation, but also to prevent the convex portion 33h and the coil spring 34 from coming into contact with each other during the process of the opening and closing operation of the clip main body 4, a comfortable opening and closing operation is possible.

In the present Embodiment, a shape of the cross section which is orthogonal to the protruding direction of the convex portion 33h is preferably a substantial circular shape. By making the shape of the cross section of the convex portion 33h a substantial circular shape, the end portion (coiled seat portion 34d) of the coil spring 34 is pressure-welded in the substantial entire circumference of the large-diameter portion 33n (a lightly pressed-in state is held). Accordingly, it is possible to prevent a positional shift of the other end portion 34b of the coil spring 34 during the clip opening and closing operation. In addition, it is possible to further prevent the small-diameter portion 33u of the convex portion 33h and the coil spring 34 from coming into contact with each other during the process of the opening and closing operation of the clip, and to perform a more comfortable opening and closing operation of the clip. Furthermore, it is possible to more reliably hold the coil spring 34 substantially integrally with respect to the convex portion 33h when the clip main body 33 is assembled to the clip supporting portion 31b of the clip slider main body, and the assembly work is further improved.

Furthermore, it is desirable that the shape of the cross section in the large-diameter portion 33n of the convex portion 33h is a substantial circular shape, and an arbitrary shape may be employed in the small-diameter portion 33u.

In addition, as illustrated in FIG. 40, a slit 33p which extends in the longitudinal direction of the clip main body 33 is formed in the convex portion 33h. The slit 33p is formed along a shaft line of the shaft main body 23 when the clip main body 33 is attached to the clip supporting portion 31b. When the clip main body 33 is assembled to the clip supporting portion 31b of the clip slider main body 31, since a force is applied towards the shaft line from the outer diameter direction of the shaft main body 23 to the clip main body 33, a force is applied to the outside in the left side plate portion 33b together with the right side plate portion 33a, a center part of the clip main body 33 is curved to be recessed in a shape of an arc, and the left side plate portion 33b together with the right side plate portion 33a are elastically deformed to be far from each other by the recessed curve. The slit 33p performs a role of making the clip main body 33 more easily elastically deformed. For this reason, when the fulcrum hole 33c of the clip main body 33 is assembled to the fulcrum shaft 31m, it is possible to perform the assembly operation more easily. Furthermore, a bottom surface 33q of the slit 33p is set to be on the same surface as that of the back side inclined inner bottom surface 33g of the clip main body 33.

When the refill 28 which is connected to the clip slider 30 is in a retracted state, as described above, by the bias force of the coil spring 34, the back side portion more than the rotating fulcrum 33d of the clip main body 33 is repulsed to be separated from the outer circumferential surface of the shaft main body 23, and the ball portion 33i which is formed in the front side portion more than the rotating fulcrum 33d of the clip main body 33 is repulsed to abut against the outer circumferential surface of the shaft main body 23 via the rotating fulcrum 33d. In this configuration, by pressing the back side portion more than the rotating fulcrum 33d of the clip main body 33 towards the shaft line from the outer diameter direction of the shaft main body 23 against the bias force of the coil spring 34, the front side portion more than the rotating fulcrum 33d of the clip main body 33 is used as the clip 32 which can perform the opening and closing operation and rotate so that the front side portion is separated from the outer circumferential surface of the shaft main body 23 via the rotating fulcrum 33d. Here, in a state where the ball portion 33i of the clip main body 33 abuts against the outer circumferential surface of the shaft main body 23, a space is provided between the inner bottom surface 33f of the clip main body 33 and the front side inclined surface 31p of the supporting plate 31j.

Meanwhile, when the pen tip 38 of the refill 28 which is connected to the clip slider 30 or the tip member portion 42 is protruded from the protruded hole 25b which is formed in the front shaft 25, as described above, the clip slider 30 falls in a direction of the shaft line, and the engagement projection 31d of the clip slider 30 is locked to a locked concave portion 27i which is provided at the center of the beam-shaped dividing wall 27e in the slidable case 27. At this time, the front side inclined surface 31p of the supporting plate 31j abuts against the inner bottom surface 33f of the clip main body 33, and the rotation to the shaft main body 23 of the front side portion more than the rotating fulcrum 33d of the clip main body 33 is regulated. In addition, by this regulation, the repulsive force to the shaft main body 23 that the clip main body 33 receives from the coil spring 34 is released, and it is possible to make a space between the ball portion 33i of the clip main body 33 and the shaft main body 23, and to easily operate the clip slider 30.

On the back side of the clip main body 33, a back side plate portion 33t which is protruded to be substantially perpendicular towards the main body side from the inner bottom surface 33f of the clip main body 33 may be formed. Accordingly, since the coil spring 34 is unlikely to be seen from the back side, the appearance when the writing instrument is viewed from the back side becomes excellent.

Figure 36:
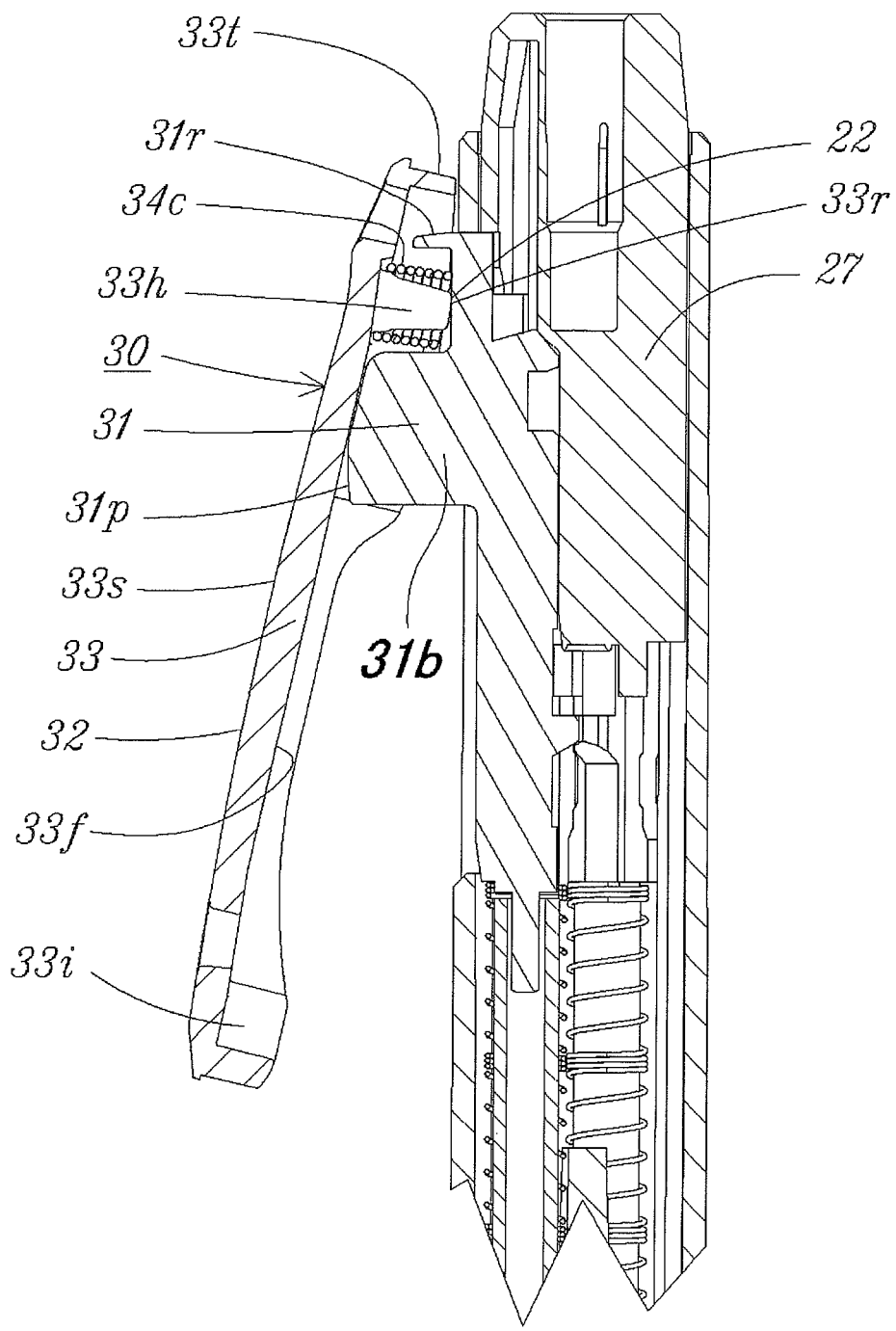
FIG. 36 is a partially enlarged longitudinal sectional view illustrating an operation of Embodiment 3 of the present invention.
Figure 37:
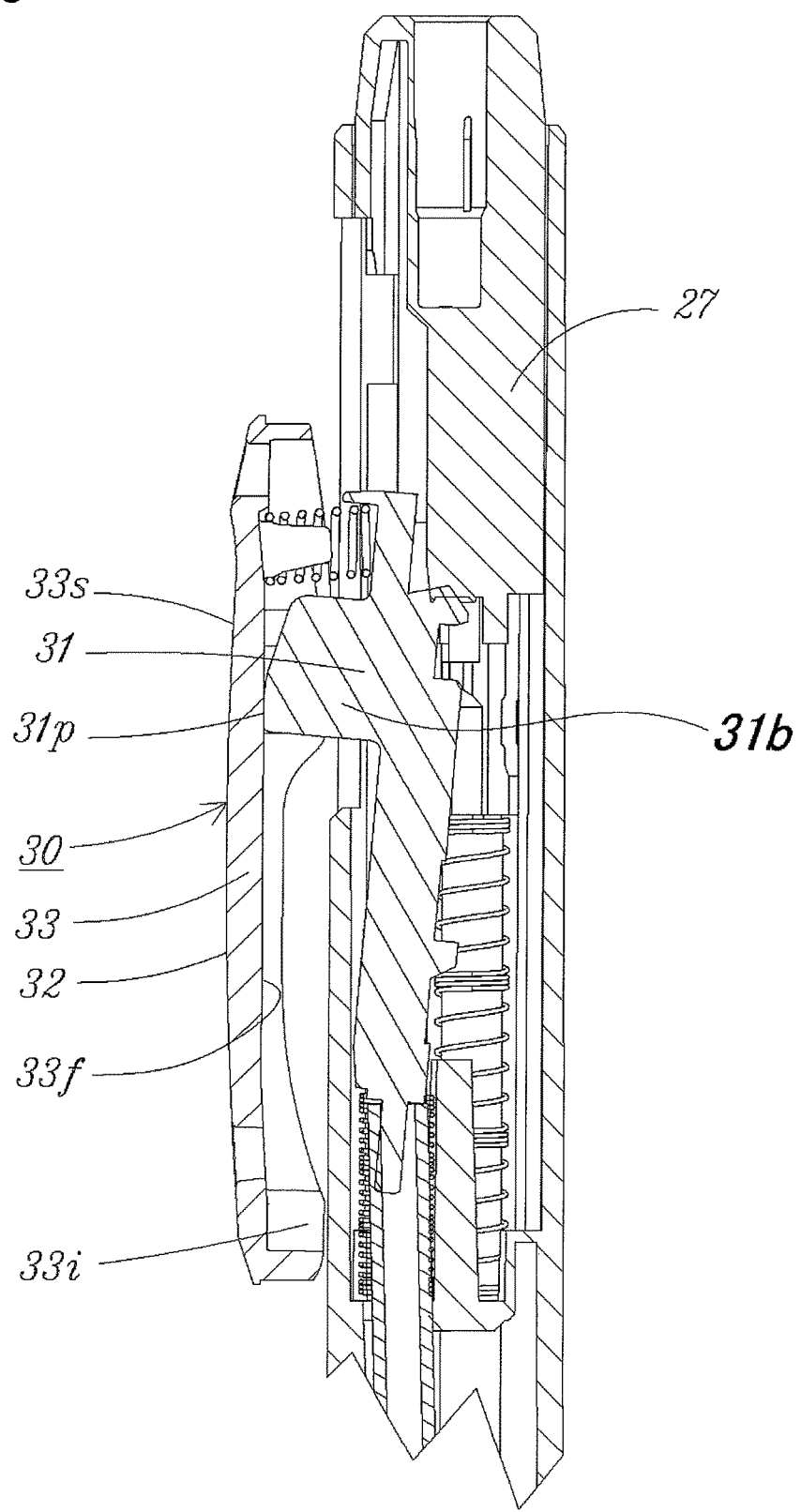
FIG. 37 is a partially enlarged view of FIG. 12.
Figure 38:
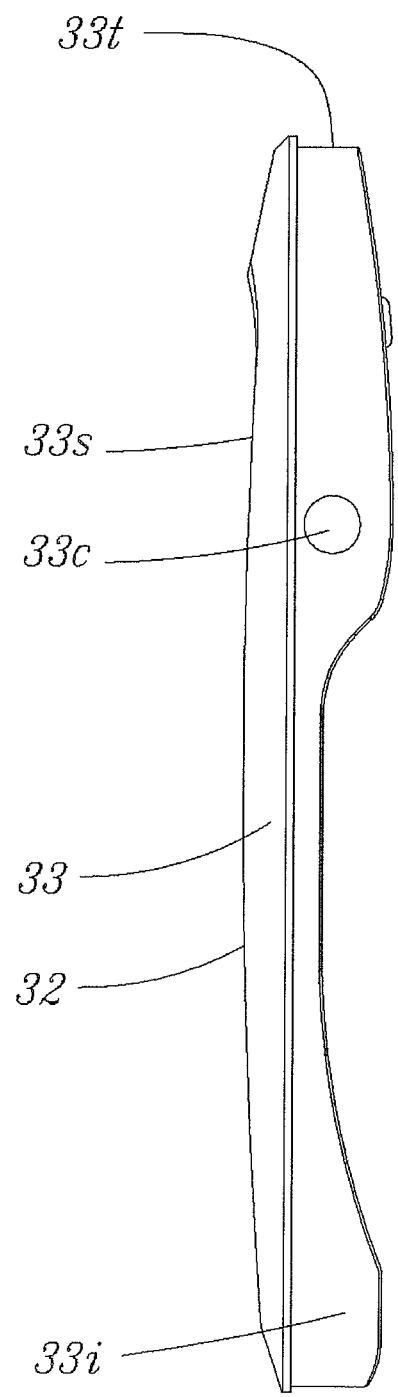
FIG. 38 is a right side view of a clip main body 33.
Figure 39:
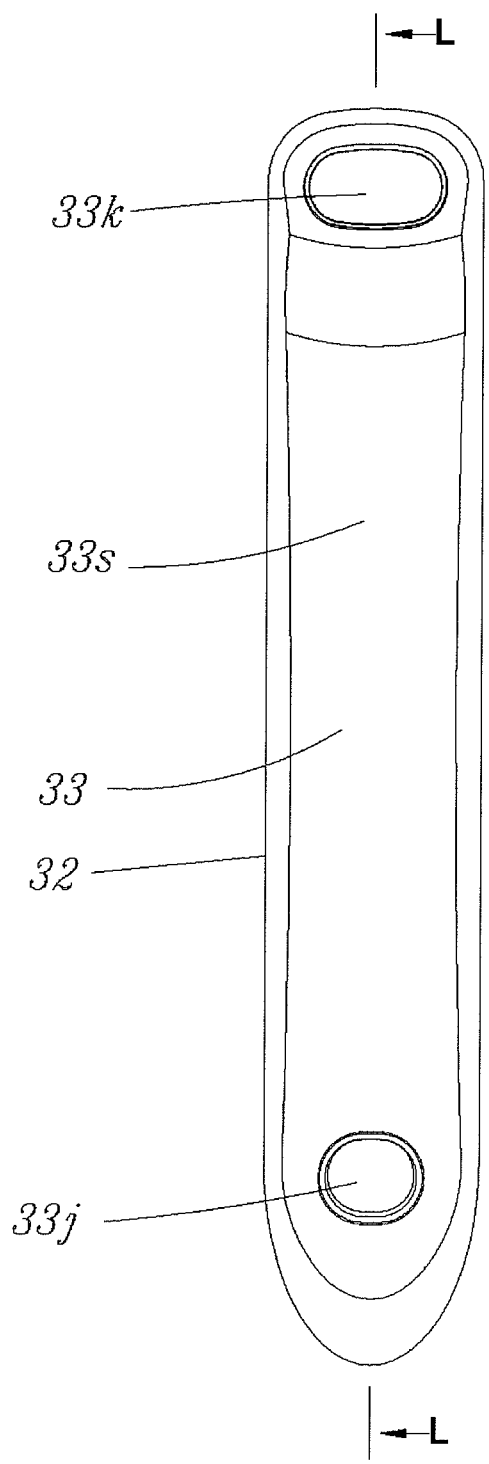
FIG. 39 is a front view of the clip main body 33.

In Embodiment 3, the back side plate portion 33t is formed in the clip main body 33, and in addition to this, the projected wall 31r is formed in the back end portion of the plane portion 31q (outer circumferential surface) of the clip slider main body 31 (FIGS. 34 to 36). Accordingly, the void between the clip main body 33 on the back side more than the coil spring 34 and the clip slider main body 31 is buried, and appearance from the back side is further improved.

When the clip expands and is opened, the height of protrusion from the inner bottom surface 33f of the back side plate portion 33t is formed to be a height at which the back side plate portion 33t does not abut against the outer circumferential surface of the main body 1, and a tip end portion 33r of the convex portion 33h abuts against the outer circumferential surface of the main body 1. However, the back side plate portion 33t may abut against the outer circumferential surface of the main body at a tip more than the tip end portion 33r of the convex portion 33h.

As described in Embodiment 3, in a case where the tip end portion 33r of the convex portion 33h is formed at a height at which the tip end portion 33r abuts against the outer circumferential surface of the main body 1, when the clip expands and is opened, an abutting location between the tip end portion 33r of the convex portion 33h and the outer circumferential surface of the main body 1 is not exposed. For this reason, even when a scratch or a recess is generated at the abutting location by the repeating opening and closing operation of the clip, there is an effect of excellently retaining the external appearance of the product.

Figure 47:
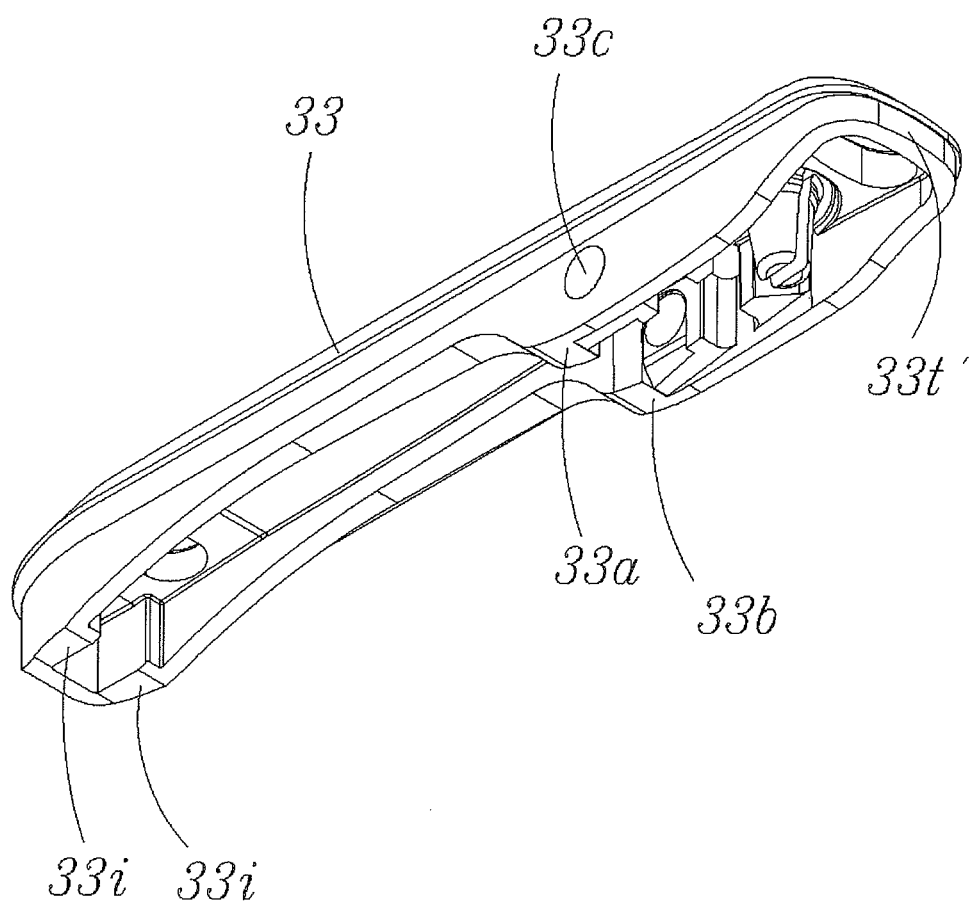
FIG. 47 is a perspective view illustrating a lower side of the clip main body 33 according to the modification example of Embodiment 3 of the present invention.

As illustrated in FIG. 47, the height of the back side plate portion 33t may be much lower (back side plate portion 33t'). When a decoration is attached to the back side through hole 33k by a string or a chain, in a case where the string or the chain is thick, the clip is more likely to expand and be open.

Figure 48:
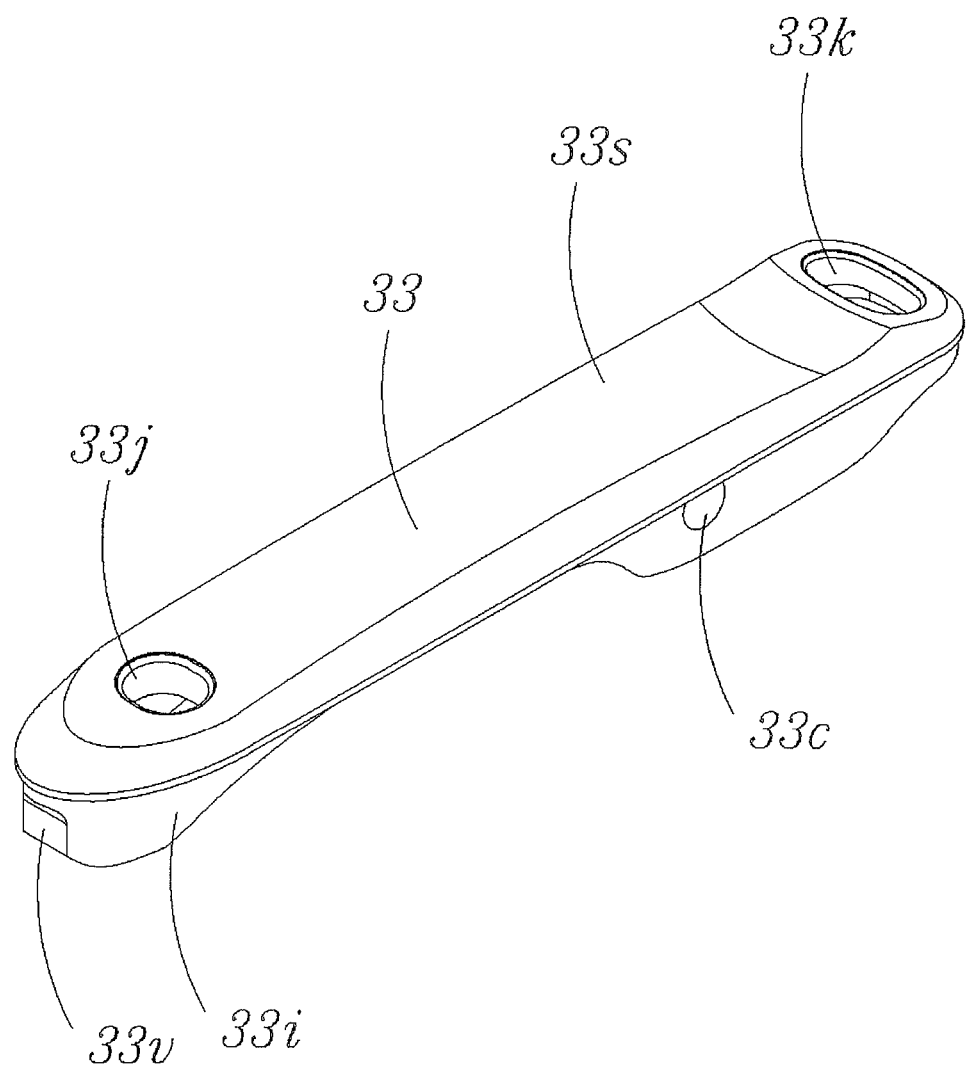
FIG. 48 is a perspective view illustrating an upper side of the clip main body 33 of FIG. 47.

Furthermore, the clip slider main body 31 illustrated in FIG. 48 is a perspective view when the clip slider main body 31 illustrated in FIG. 47 is viewed from the top surface portion side. A concave portion illustrated by reference numeral 33v is formed since a gate is provided when injection molding is performed to the concave portion 33v, but may not necessarily be formed.

Furthermore, in Embodiment 3, the back side plate portion 33t of the clip main body 33 and the left side plate portion 33b together with the right side plate portion 33a are formed to be continuous, but may not necessarily be formed to be continuous.

In Embodiment 3 as described above, the clip attaching structure includes the clip slider main body 31 which constitutes the clip supporting portion 31b protruded from the outer circumferential surface of the clip slider 30 (main body 24), the clip main body 33 which is engaged with the clip supporting portion 31b, and the coil spring 34 which biases the back portion of the clip main body 33 to be separated from the outer circumferential surface of the shaft main body 23. As the clip supporting portion 31b and the clip main body 33 are engaged with each other, the clip main body 33 constitutes the rotating fulcrum 33d to be freely rotatable. The coil spring 34 is installed on the back side more than the rotating fulcrum 33d. The front side more than the rotating fulcrum 33d of the clip main body 33 is constantly biased to abut against the outer circumferential surface of the shaft main body 23. On the surface which faces the outer circumferential surface of the shaft main body 23 of the clip main body 33, the convex portion 33h which is protruded towards the outer circumferential surface of the shaft main body 23 is provided, and the plane portion 31q is provided in the clip slider main body 31 which is installed on the outer circumferential surface of the shaft main body 23 that faces the convex portion 33h. The one end portion 34a of the coil spring 34 is inserted into the convex portion 33h from the outside, and the other end portion 34b of the coil spring 34 abuts against the plane portion 31q.

For this reason, by the contraction of the coil spring 34 according to the opening and closing operation of the clip main body 33, when the inner diameter and the outer diameter of the coil spring 34 increase, the interval between the outer circumferential surface of the convex portion 33h and the inner circumferential surface of the coil spring 34 becomes wider, and the contact area between the convex portion 33h and the coil spring 34 is reduced. As a result, frictional resistance decreases, and a comfortable opening and closing operation is possible. In addition, the outer diameter of the coil spring 34 becomes the outmost diameter of the repulsive portion 34c, and it is possible to make the size of the repulsive portion 34c small. Furthermore, it is also possible to make the size of the clip main body 33 which accommodates the repulsive portion 34c in the substantial U-shaped inner surface portion small. In particular, it is possible to reduce the width of the clip main body 33, and to improve a degree of freedom of a design of the clip 32.

Figure 43:
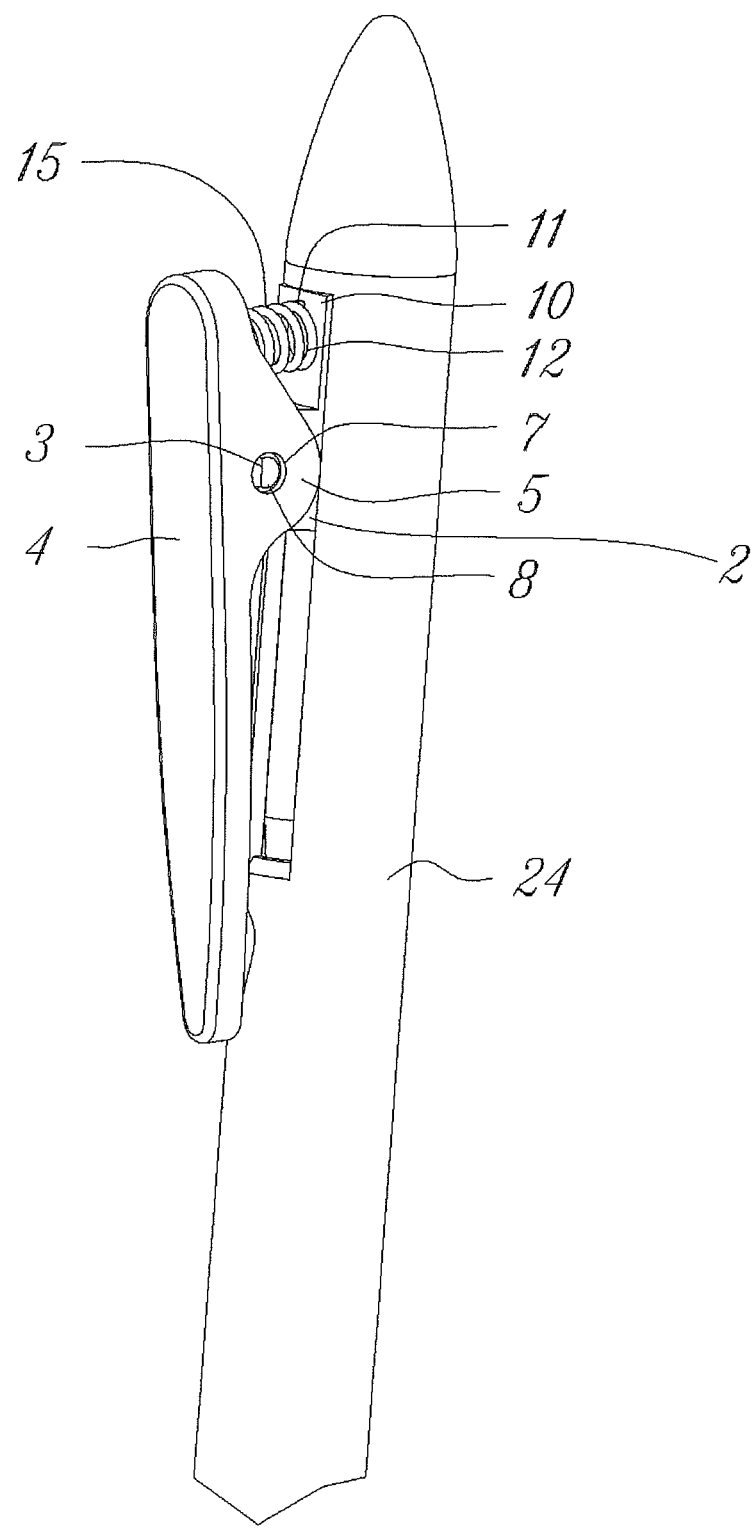
FIG. 43 is a perspective view illustrating a second modification example of Embodiment 1 and Embodiment 2 of the present invention.

Furthermore, in the present Embodiment, a configuration in which the clip of the present invention is attached to one of the sliders of a sliding type multi-core writing instrument is illustrated, but the invention is not limited thereto. As illustrated in FIG. 43 as the second modification example of Embodiment 1 and Embodiment 2, the clip of the present invention may be attached to the slider a sliding type single-core writing instrument in which only one refill is embedded.

Next, an operation effect, which is common in Embodiment 1, Embodiment 2, and Embodiment 3, of tip end portions of the convex portions (14, 16, and 33h) in the opening and closing operation of the clip, will be described. When rotation by a predetermined amount is performed by performing the above-described opening and closing operation, tip end portions 20, 21, and 33r of the convex portions 14, 16, and 33h abut against the plane portions 10 and 31q of the main bodies 1 and 24. In other words, the convex portions (14, 16, and 33h) function as stoppers which regulate the rotation by equal to or greater than the predetermined amount, and constitute a rotating amount regulating portion 22 together with the plane portions 10 and 31q (FIGS. 8 and 36). The rotation by the predetermined amount described here means rotation by a rotating amount in which twisting stress of the coil springs 11 and 34 which increases as the coil springs 11 and 34 contract by the opening operation does not reach a value that causes deterioration of the repulsive force of the coil springs 11 and 34. In this configuration, there is an effect of preventing deterioration of the repulsive force of the coil springs 11 and 34 which is caused as the user carelessly opens the clip too much.

In addition, as described above, since the convex portions 14, 16, and 33h include the coil springs 11 and 34, the abutting location between the tip end portions 20, 21, and 33r, and the plane portions 10 and 31q are not exposed. Therefore, even when a scratch or a recess is generated at the abutting location by the repeating opening and closing operation, there is an effect of excellently retaining the external appearance of the product.

Furthermore, when the convex portions 14, 16, and 33h hold the coil springs 11 and 34, since the tip end portions 20, 21, and 33r function as stoppers which regulate the rotating amount when the clip expands and is opened, it is possible to configure the repulsive portions 15 and 34c and the rotating amount regulating portion 22 in a space which is smaller than that in a case where the repulsive portions 15 and 34c and the rotating amount regulating portion 22 are separately provided, and there is an effect of improving a degree of freedom of designs of the clip main bodies 4 and 31.

The present application is based on Japanese Patent Application (Japanese Patent Application No. 2013-036519) filed on Feb. 27, 2013, and the content thereof is included here as a reference.

REFERENCE SIGNS LIST

1 Main body
2 Clip supporting portion
3 Fulcrum shaft
3a Tapered surface portion
4 Clip main body
5 Right side plate portion
6 Left side plate portion
7 Fulcrum hole
8 Rotating fulcrum
9 Inner bottom surface
10 Plane portion
11 Coil spring
12 One end portion
13 The other end portion
14 Convex portion
15 Repulsive portion
16 Convex portion
17 Large-diameter portion
18 Small-diameter portion
19 Coiled seat portion
20 Tip end portion
21 Tip end portion
22 Rotating amount regulating portion
23 Shaft main body
24 Main body
25 Front shaft
25a Conical portion
25b Protruded hole
25c Screw portion end surface
25d External appearance back end surface
26 Back shaft
26a Window hole
26a' Window hole
26b Back end opening portion
26c Regulating portion
26d Through hole
26e Inner circumferential surface
26f Refill regulating rib
26g Positioning rib
26h Inserting groove
26i Screw fastening step portion
26j Back shaft tip end surface
27 Slidable case
27a Engagement projection
27b Cut-out portion
27c Front half portion
27d Knocking portion
27e Dividing wall
27f Tube portion
27g Cut-out portion
27h Slider abutting portion
27i Clip slider abutting portion
27j Locked concave portion
27k Division
28 Refill
29 Slider
29a Pressing portion 29b Cut-out portion
29c Arc-shaped abutting portion
29d Engagement projection
29e Falling-out prevention projection
29f Releasing projection
29g Releasing projection
29h Flange portion
30 Clip slider
31 Clip slider main body
31a Apex
31b Clip supporting portion
31c Arc-shaped abutting portion
31d Engagement projection
31e Falling-out prevention projection
31e' Falling-out prevention projection
31f Releasing projection
31g Releasing projection
31h Flange portion
31i Supporting stand
31j Supporting plate
31k Thinned groove
31m Fulcrum shaft
31n Projected plate
31p Front side inclined surface
31q Plane portion
31r Projected wall
31s Tapered surface portion
31u Concave portion
32 Clip
33 Clip main body
33a Right side plate portion
33b Left side plate portion
33c Fulcrum hole
33d Rotating fulcrum
33e Groove portion
33f Inner bottom surface
33g Back side inclined inner bottom surface
33h Convex portion
33i Ball portion
33j Front side through hole
33k Back side through hole
33m Front side inclined inner bottom surface
33n Large-diameter portion
33p Slit
33q Bottom surface
33r Tip end portion
33s Top surface portion
33t Back side plate portion
33t' Back side plate portion
33u Small-diameter portion
33v Concave portion
34 Coil spring
34a One end portion
34b The other end portion
34c Repulsive portion
34d Coiled seat portion
35 Repulsive member
36 Projection portion
36a Swelling portion
37 Ballpoint pen unit
38 Pen tip
39 Ink storage tube
40 Ink
41 Sharp unit
42 Tip member portion
43 Core tank
44 Hole portion
44a Inner circumferential surface
44b Refill fitting projection
45 Detachable member
L Sharp core

The invention claimed is:

1. A clip attaching structure, comprising:
   a clip supporting portion which is protrudes on an outer circumferential surface of a main body;
   a clip which is engaged with the clip supporting portion; and
   a coil spring which biases one end portion of the clip in a direction of being separated from the outer circumferential surface of the main body,
   wherein the clip is configured to be rotatable with respect to a fulcrum at which the clip is engaged with the clip supporting portion,
   wherein the coil spring is provided closer to the one end portion of the clip than the fulcrum, and biases the clip so that the other end portion of the clip abuts against the outer circumferential surface of the main body,
   wherein the clip has a convex portion which protrudes towards the outer circumferential surface of the main body from a surface of the clip which faces the outer circumferential surface of the main body,
   wherein the convex portion is inserted into an inside of one end portion of the coil spring,
   wherein the other end portion of the coil spring abuts against the outer circumferential surface of the main body, and
   wherein an outer diameter of a base portion of the convex portion is greater than an inner diameter of the coil spring, and an outer diameter of a tip end portion of the convex portion is smaller than the inner diameter of the coil spring.

2. The clip attaching structure according to claim 1, wherein the outer circumferential surface of the main body has a plane portion, and the other end portion of the coil spring abuts against the plane portion.

3. The clip attaching structure according to claim 1, wherein, when the clip rotates by a predetermined amount in a direction in which the other end portion of the clip is separated from the outer circumferential surface of the main body, a tip end of the convex portion abuts against the outer circumferential surface of the main body.

4. The clip attaching structure according to claim 1, wherein a slit is formed in the convex portion along a longitudinal direction of the clip.

5. The clip attaching structure according to claim 1, wherein a shape of the convex portion in a cross section orthogonal to a direction in which the convex portion protrudes is a circular shape.

6. The clip attaching structure according to claim 1, wherein the main body is a shaft tube of a writing instrument.

7. The clip attaching structure according to claim 6, wherein a slider is provided in the main body in order to operate a pen tip of the writing instrument.

8. The clip attaching structure according to claim 7, wherein a plurality of sliders for operating a pen tip of the writing instrument are provided in the main body, and the clip supporting portion is provided in at least one of the sliders.

9. A clip attaching structure, comprising:
   a clip supporting portion which protrudes on an outer circumferential surface of a main body;
   a clip which is engaged with the clip supporting portion; and a coil spring which biases one end portion of the clip in a direction of being separated from the outer circumferential surface of the main body, wherein the clip is configured to be rotatable with respect to a fulcrum at which the clip is engaged with the clip supporting portion, wherein the coil spring is provided closer to the one end portion of the clip than the fulcrum, and biases the clip so that the other end portion of the clip abuts against the outer circumferential surface of the main body, wherein the clip has a convex portion which protrudes towards the outer circumferential surface of the main body from a surface of the clip which faces the outer circumferential surface of the main body, wherein the convex portion is inserted into an inside of one end portion of the coil spring, wherein the other end portion of the coil spring abuts against the outer circumferential surface of the main body, and wherein a slit is formed in the convex portion along a longitudinal direction of the clip.

10. The clip attaching structure according to claim 9, wherein the outer circumferential surface of the main body has a plane portion, and the other end portion of the coil spring abuts against the plane portion.

11. The clip attaching structure according to claim 9, wherein an outer diameter of a base portion of the convex portion is greater than an inner diameter of the coil spring, and an outer diameter of a tip end portion of the convex portion is smaller than the inner diameter of the coil spring.

12. The clip attaching structure according to claim 9, wherein, when the clip rotates by a predetermined amount in a direction in which the other end portion of the clip is separated from the outer circumferential surface of the main body, a tip end of the convex portion abuts against the outer circumferential surface of the main body.

13. The clip attaching structure according to claim 9, wherein a shape of the convex portion in a cross section orthogonal to a direction in which the convex portion protrudes is a circular shape.

14. The clip attaching structure according to claim 9, wherein the main body is a shaft tube of a writing instrument.

15. The clip attaching structure according to claim 14, wherein a slider is provided in the main body in order to operate a pen tip of the writing instrument.

16. The clip attaching structure according to claim 14, wherein a plurality of sliders for operating a pen tip of the writing instrument are provided in the main body, and the clip supporting portion is provided in at least one of the sliders.

17. A clip attachment structure for attaching a clip to a main body, the clip attachment structure comprising:
a clip support portion that protrudes outwardly from an outer surface of a main body;
a clip having opposite end portions and being pivotably attached on the clip supporting portion to undergo pivotal movement; and
a coil spring interposed between the clip and the outer surface of the main body, the coil spring exerting a biasing force on the clip that biases one end portion of the clip outwardly away from the outer surface of the main body and that biases the other end portion of the clip inwardly to abut against the outer surface of the main body,
wherein the clip has a protrusion that protrudes toward the outer surface of the main body into an inside of one end portion of the coil spring, and
wherein the other end portion of the coil spring slidingly abuts against a smooth portion of the outer surface of the main body, the smooth portion being free of projections thereby allowing the other end portion of the coil spring to undergo free sliding displacement on the smooth portion.

18. The clip attaching structure according to claim 17, wherein an outer diameter of a base portion of the protrusion is greater than an inner diameter of the coil spring, and an outer diameter of a tip end portion of the protrusion is smaller than the inner diameter of the coil spring.

19. A clip attachment structure according to claim 17; wherein the protrusion gradually tapers inwardly in a direction toward the main body.

20. A clip attachment structure according to claim 17; wherein the main body comprises a main body of a writing instrument,
wherein the writing instrument includes a manually-actuatable slider configured to advance and retract a writing tip of the writing instrument, and
wherein the clip support portion is provided on the slider.

* * * * *

UNITED STATES PATENT AND TRADEMARK OFFICE
CERTIFICATE OF CORRECTION

PATENT NO. : 9,784,294 B2
APPLICATION NO. : 14/770255
DATED : October 10, 2017
INVENTOR(S) : Hideo Uchida and Masashi Machida It is certified that error appears in the above-identified patent and that said Letters Patent is hereby corrected as shown below:

On the Title Page

Item (22), the PCT international filing date:
"Dec. 27, 2014"
Should be changed to:
--Feb. 27, 2014--.

Signed and Sealed this
Twenty-ninth Day of May, 2018

Andrei Iancu
*Director of the United States Patent and Trademark Office*